US012257204B1

(12) United States Patent
Pesek

(10) Patent No.: US 12,257,204 B1
(45) Date of Patent: Mar. 25, 2025

(54) WALKER TRAY FOR USE WITH A WALKER APPARATUS

(71) Applicant: Peak Degrees Holdings LLC, Trophy Club, TX (US)

(72) Inventor: Christopher Pesek, Trophy Club, TX (US)

(73) Assignee: Peak Degrees Holdings LLC, Trophy Club, TX (US)

( * ) Notice: Subject to any disclaimer, the term of this patent is extended or adjusted under 35 U.S.C. 154(b) by 0 days.

(21) Appl. No.: 18/655,824

(22) Filed: May 6, 2024

(51) Int. Cl.
*A61H 3/04* (2006.01)
*A61H 3/00* (2006.01)

(52) U.S. Cl.
CPC ......... *A61H 3/04* (2013.01); *A61H 2003/004* (2013.01)

(58) Field of Classification Search
CPC ............................ A61H 3/04; A61H 2003/004
See application file for complete search history.

(56) References Cited

U.S. PATENT DOCUMENTS

| | | | |
|---|---|---|---|
| 4,708,274 | A | 11/1987 | Roche |
| D305,015 | S | 12/1989 | Roche |
| 4,907,839 | A | 3/1990 | Rose et al. |
| 5,217,032 | A | 6/1993 | Jobst |
| 5,273,063 | A | 12/1993 | Farr et al. |
| D353,123 | S | 12/1994 | Korona |
| D367,834 | S | 3/1996 | Beavers et al. |
| 5,642,748 | A | 7/1997 | Obitts |
| D403,280 | S | 12/1998 | Diestel et al. |
| D422,539 | S | 4/2000 | Jacobson |
| D423,290 | S | 4/2000 | Green |
| 6,883,529 | B2 | 4/2005 | Kvaternik |
| 6,948,727 | B1 | 9/2005 | Bakken |
| D545,523 | S | 6/2007 | Goldberg et al. |
| D564,421 | S | 3/2008 | McKenna |
| D575,077 | S | 8/2008 | Kessels |
| 7,712,477 | B2 | 5/2010 | McCarthy |
| D619,506 | S | 7/2010 | Isaksen et al. |
| D619,938 | S | 7/2010 | McCarthy |
| D665,595 | S | 8/2012 | Francis |
| D745,442 | S | 12/2015 | McCuen et al. |
| 9,883,984 | B2 * | 2/2018 | Reda ........................ A61H 3/04 |
| D863,890 | S | 10/2019 | Norell |
| D928,669 | S | 8/2021 | Bodman |

(Continued)

*Primary Examiner* — Noah Chandler Hawk
(74) *Attorney, Agent, or Firm* — Christopher J. Scott

(57) ABSTRACT

A walker tray is removably attachable to a walker for enabling a user to support items. In some embodiments, the walker tray is light-transmissive for enabling a user to see through the tray. The walker tray includes a tray-to-walker attachment mechanism, and in this regard, some embodiments either include a pair of laterally opposed handle-receiving apertures or resilient clip elements. In those embodiments having handle-receiving apertures for mounting the tray upon the walker, each aperture has an aperture and an aperture width. The aperture lengths and aperture widths are configured to receive at least upper handle portions of a walker. Each of the handle-receiving apertures are defined inwardly by an inner leg-engaging edge configured to engage at least a forward leg portion and a rearward leg portion. Together the forward and rearward leg portions and the inner leg-engaging edge are cooperable to support the walker tray upon the walker.

18 Claims, 28 Drawing Sheets

(56) References Cited

U.S. PATENT DOCUMENTS

| | | | | |
|---|---|---|---|---|
| 2005/0067004 | A1 * | 3/2005 | Kvaternik | A61H 3/00 135/67 |
| 2008/0007020 | A1 * | 1/2008 | Holman | A61H 3/00 280/87.051 |
| 2016/0199247 | A1 * | 7/2016 | McCuen | A61H 3/04 108/26 |
| 2021/0154083 | A1 * | 5/2021 | Downes | A61H 3/00 |
| 2022/0057613 | A1 * | 2/2022 | Poston | G02B 17/008 |

* cited by examiner

WALKER TRAY FOR USE WITH A WALKER APPARATUS

FIELD OF THE INVENTION

The present invention relates generally to an accessory for a walker apparatus, and more particularly to a walker tray for use with a walker apparatus to accessorize the same and enhance the utilitarian features thereof.

BRIEF DESCRIPTION OF THE PRIOR ART

As the world's population ages, given enough time, it is inevitable that both men and women will eventually require the use of a walking aid. There are three general categories of these aids. They are: (1) Canes; (2) (Folding) Walkers; and (3) Rollator Walkers. The presently disclosed subject matter is directed primarily for use with category 2 or (folding) walkers. Folding walkers are by far the most widely used product when it comes to the walker category of walking aids. A walker apparatus or walking frame is a device that gives support to maintain balance or stability to a user while walking most commonly due to mobility disability most commonly cause by age-related frailty.

A walker is also commonly used by those who are recuperating from leg or back injuries or persons having problems with walking or with mild balance problems. In the United States, U.S. Pat. No. 2,656,874 issued to William C. Robb in October 1953 with an effective filing date of 11 Aug. 1949. Elmer Ries then later patented certain walker designs as exemplified by the subject matter of U.S. Pat. No. 2,996,070, issued 15 Aug. 1961 and U.S. Pat. No. 3,165,112, issued 12 Jan. 1965. Some consider the first modern walker to be embodied by the subject matter disclosed and described in U.S. Pat. No. 3,517,677, issued to Alfred A. Smith on 30 Jun. 1970.

The basic design consists of a lightweight frame that is about waist high, approximately 12 inches or 30 centimeters deep and slightly wider than the user. Some walkers have adjustable heights and are also provided in pediatric and bariatric sizes. In a preferred application, a walker should have upper handle portions set at a height that is comfortable for the user, but will allow the user to maintain a slight bend in their arms for allowing improved blood circulation through the arms as the walker is used. The front two legs of the walker may or may not have wheels attached, depending on the strength and abilities of the person using it. It is also common to see wheels or glides on the back legs of a walker with wheels on the front. Users may sometimes outfit the bottom portions of the legs with felt products or tennis balls with holes cut in them for use on smooth surfaces common to institutions for the aged.

A user walks with the frame surrounding their front and sides and their hands provide additional support by holding on to the top of the sides of the frame. Traditionally, a walker is picked up and placed a short distance ahead of the user. The user then walks to it and repeats the process. With the use of wheels and glides, the user may push the walker ahead as opposed to picking it up. This makes for easier use of the walker, as it does not require the user to use their arms to lift the walker. This is beneficial for those with little arm strength. Related to the traditional walker is hemi-walker, a walker about half the size of a traditional walker which is intended for use by persons whose dexterity is limited or non-existent in one hand or arm. These walkers are more stable than a quad cane, but are generally not recommended as highly as a traditional walker for those who are able to use the same since the traditional walker provides laterally opposed arm support stability.

Walker trays later developed to increase the utilitarian features of a traditional walker and enable users to support items of use upon the walker tray for ease of reach and accessibility. U.S. Pat. No. 4,708,274 ('274 Patent), issued to Roche for example, discloses a Removable Tray Apparatus for a Walker. The '274 Patent describes an apparatus for use with a walker of a type having four vertically disposed legs which are adapted to contact the floor at the bottom thereof. Handles are provided on each side of the walker and first and second horizontal elongated members are disposed below each of the handles. A rigid tray is provided for extending over and above the first and second horizontal elongated members, with each side of the tray having first and second downwardly extending flanges thereon for preventing the tray from falling off of the first and second horizontal elongated members. The tray is not bolted or fastened to the walker itself so that it can be easily and quickly removed from or placed onto the first and second horizontal elongated members.

In some applications, a walker seat is provided for enabling a user to sit thereupon during transit so as to alleviate the user from over-exertion. U.S. Pat. No. 4,907,839 ('839 Patent), issued to Rose et al. for example, discloses a Walker with Folding Seat. The '839 Patent describes a walker with a retrofittable foldable sheet has at least one front leg and a plurality of rear legs. Clamps attach to each of the legs and a seat extends over and is supported by the clamps. A guide connects a portion of the seat to at least one of the forward legs to allow the seat to be moved from an in-use position to a storage position against the forward legs. The seat has a receptacle for each clamp when positioned for use and a receptacle for each front clamp and for the guide when in storage. Clips are used to hold the walker against the forward legs of the walker.

The presently disclosed subject matter is more particularly directed to walker trays as further exemplified by the subject matter of U.S. Pat. No. 5,217,032 ('032 Patent), issued to Jobst. The '032 Patent discloses a Tray for a Walker Frame on which tray various items may be transported while the user's hands are engaged in maneuvering the walker frame. The tray is slide coupled in position such that the tray may be extended forward of the frame to allow a person to stand within the confines of the frame in the course of manipulating the frame. When desired, the user may draw the tray back more fully within the confines of the frame for use as a small table or work surface.

U.S. Pat. No. 5,273,063 ('063 Patent, issued to Farr et al., discloses a Folding Tray for Invalid Walkers. The '063 Patent describes a fold-down detachable utility tray for invalid walkers comprising a generally rectangular tray frame in combination with a pair of locking, fold-down arms each having spring clips for securement to the upright members of walker. In a preferred embodiment, the center of gravity of the tray is located over the pivot point of the locking arms, so that the weight of objects placed on the tray causes the arms to lock more tightly, promoting stability of the tray. The locking arms each comprise an elongated angle bracket provided with a pivot. An actuator arm has a first end movably connected to the pivot and a second end slidingly engaged in a slot in the tray frame. One end of the slot is provided with an upwardly extending locking notch to hold the arm in the extended position.

U.S. Pat. No. 5,642,748 ('748 Patent), issued to Obitts, discloses a Walker Tray. The '748 Patent describes a pivoting tray for use with a walker. A pair of link arms disposed on each side of the tray provide for case of movement between a first, operative position disposed between side frame assemblies of the walker, to a second, storage position generally vertically oriented in front of the walker. The mounting brackets are adapted for use with either a single actuator or dual release style of walker. Moreover, the mounting bracket is symmetrical for use on both the right-hand and left-hand sides of the walker, thereby reducing manufacturing costs and inventory.

U.S. Pat. No. 6,883,529 ('529 Patent), issued to Kvaternik, discloses a Removable Tray for a Walker. The '529 Patent describes a walker and tray combination including a first pair of spaced-apart legs connected to one another by a first upper connecting bar extending between respective points adjacent an upper end of each of the first pair of legs. The combination also includes a second pair of spaced-apart legs connected to one another by a second upper connecting bar extending between respective points adjacent an upper end of each of the second pair of legs. At least one strut connects the first pair of legs to the second pair of legs, and a connector is configured to selectively retain the tray in one of a primary position or a secondary position.

U.S. Pat. No. 7,712,477 ('477 Patent), issued to McCarthy, discloses a Tray for a Walker. The '477 Patent describes a tray including a generally rigid tray base having an essentially rectangular shape with a front long side, a back long side, a first short side and a second short side wherein the tray has a length that extends to or past laterally opposed support members formed on the walker. In some embodiments, the tray base comprises a ridge extending along the sides of the tray; a strap positioned at or near the back long end; and a pair of hinge members positioned at or near the forward legs. The length of the tray is greater than the distance between support members of laterally opposed supports and the width of the tray is less than the length of the support members of the laterally opposed supports.

U.S. Design Pat. No. D745,442 ('442 Patent), issued to McCuen et al. on 15 Dec. 2015, discloses a Transparent Walker Tray. The ornamental design of the Transparent Walker Tray shows a tray having front long side, a back long side, and laterally opposed short sides wherein the tray has a length that extends to or past laterally opposed support members formed on the walker. A pair of laterally opposed handle-receiving apertures are formed in the tray in parallel relation to the laterally opposed short sides inwardly adjacent thereto. The Transparent Walker Tray further shows a third aperture formed through a tray support portion of the tray in adjacency to a first of the laterally opposed handle-receiving apertures.

The prior art thus perceives a need for a removable walker tray that in some embodiments is transparent for enabling a user to perceive objects located underneath the walker tray as the user maneuvers the walker as outfitted with the tray and configured to provide a relatively more universally removably attachable tray for use with a variety of walker designs. The presently disclosed subject matter attempts to provide such a solution as summarized in more detail hereinafter.

General Descriptions

There is provided in accordance with an embodiment of the presently disclosed subject matter a walker tray for use with a walker apparatus having laterally opposable upper handle portions each of which extend in a handle plane. Each handle portion is supportable within the handle plane by a forward leg and a rearward leg, which forward and rearward legs are angled relative to one another. The walker tray according to the presently disclosed subject matter comprises a forward edge, a rearward edge, laterally opposed edges, and a tray support portion extending intermediate the forward, rearward, and laterally opposed edges. The tray support portion comprises an upper tray surface and a lower tray surface.

The walker tray according to the presently disclosed subject matter further comprises a pair of laterally opposed handle-receiving apertures extending through the tray support portion inwardly adjacent the laterally opposed edges each of which extend along an aperture plane intersecting the forward and rearward edges. Each of the handle-receiving apertures has an aperture length extending along the aperture planes and an aperture width extending orthogonally relative to the aperture planes. The aperture lengths and aperture widths are configured to receive at least the upper handle portions of the walker apparatus. Each of the handle-receiving apertures are defined inwardly by an inner leg-engaging edge configured to engage at least a forward leg portion and a rearward leg portion, which forward and rearward leg portions and the inner leg-engaging edge together cooperate to support the walker tray upon the walker apparatus.

In some embodiments, at least the tray support portion of the walker tray is formed from a light-transmissive material for allowing light to pass therethrough and for enabling a user to see through at least the tray support portion of the walker tray. In some embodiments, at least the tray support portion is formed from a colored light-transmissive material for altering the transmittance thereof. In some embodiments, the aperture planes are obliquely angled relative to a forward direction. In some embodiments, the aperture planes are obliquely angled relative to the laterally opposed edges. In some embodiments, the walker tray comprises an upper peripheral edge ridge formation extending along the forward, rearward and laterally opposed edges such that an upper edge portion of the upper peripheral edge ridge formation extends in an upper edge plane in parallel relation to the upper tray surface.

In some embodiments, the walker tray comprises a bottom edge extending in a lower edge plane parallel to the upper ridge plane, the upper tray surface, and the lower tray surface. In some embodiments, each handle-receiving aperture comprises a peripheral aperture ridge formation such that a first upper ridge portion of the upper peripheral aperture ridge formation extends in a first upper ridge plane intermediate the upper tray surface and the upper edge plane in parallel relation thereto. In some embodiments, each handle-receiving aperture comprises a radiused portion inwardly adjacent the forward edge and the rearward edge. In some embodiments, the radiused portions extend convexly relative to one another intermediate the aperture width coextensively therewith.

In some embodiments, forward edge comprises a forward edge radius and the rearward edge comprises a rearward edge radius, the forward and rearward radii being convex relative to a user positioned at the rearward edge. In some embodiments, the rearward edge radius is lesser than the forward edge radius. In some embodiments, the walker tray according to the presently disclosed subject matter comprises at least a third aperture extending through the upper and lower tray surfaces. In some embodiments, the third aperture comprises a third upper peripheral aperture ridge formation that a third upper ridge portion of the third upper peripheral aperture ridge formation extends in a second upper ridge plane intermediate the upper tray surface and the upper edge plane in parallel relation thereto. In some embodiments, the first and second upper ridge planes are coplanar. In some embodiments, the third aperture comprises a lower peripheral aperture ridge formation that a lower ridge portion of the lower peripheral aperture ridge formation extends in a lower ridge plane intermediate the lower tray surface and the lower edge plane in parallel relation thereto.

In some embodiments, the walker tray according to the presently disclosed subject matter may further comprises a removable lens element. The removable element is configured to removably attach to at least the third aperture for refracting light passing therethrough. In some embodiments, the removable lens element is configured to seat upon the third upper peripheral aperture ridge formation. In some embodiments, the removable lens element is characterized by comprising a biconvex lens for optionally providing a magnifier lens element to users. In some embodiments, at least one of the forward edge, the rearward edge and the laterally opposed edges comprises a hanger mechanism for enabling a user to hang a utility bag upon the walker tray. In some embodiments, the hanger mechanism is characterized by at least one of a strap-receiving aperture and a loop supporting hook member.

In some embodiments, a walker tray attaches to a walker apparatus having laterally opposable handle portions each of which extend in a handle plane having a vertical dimension. Each handle portion is supportable within a respective handle plane by at least one leg. In some embodiments, the walker tray according to the presently disclosed subject matter comprises a forward portion, a rearward portion, laterally opposed portions, and a tray support portion extending intermediate said forward, rearward, and laterally opposed portions. In some embodiments, the walker tray further comprises a tray-to-walker attachment mechanism configured to removably attach the walker tray to the walker apparatus so as to position the tray support portion in a support plane for providing a horizontal support surface for enabling a user to support items thereupon. In some embodiments, at least the tray support portion is formed from a light-transmissive material for allowing light to pass therethrough and for enabling the user to see through at least the tray support portion of the walker tray.

In some embodiments, the tray-to-walker attachment mechanism is characterized by a pair of laterally opposed handle-receiving apertures extending through the tray support portion inwardly adjacent the laterally opposed portions each of which extend along an aperture plane intersecting the forward and rearward portions. In some embodiments, each of the handle-receiving apertures has an aperture length extending along a respective aperture plane and an aperture width extending orthogonally relative thereto. In some embodiments, the aperture lengths and aperture widths are configured to receive at least the opposable handle portions.

In some embodiments, the opposable handle portions are supportable within the handle planes by a forward leg and a rearward leg. In some embodiments, the forward and rearward legs are angled relative to one another. In some embodiments, each of the handle-receiving apertures are defined inwardly by an inner leg-engaging edge configured to engage at least a forward leg portion and a rearward leg portion, said forward and rearward leg portions and said inner leg-engaging edges for wedge-supporting the walker tray upon the walker apparatus. In some embodiments, the aperture planes are obliquely angled relative to a forward direction.

In some embodiments, the tray support portion comprises at least one aperture and a removable lens element. In some embodiments, the removable element is configured to removably attach to the at least one aperture for refracting light passing therethrough. In some embodiments, the at least one aperture comprises an upper peripheral aperture ridge formation. In some embodiments, the removable lens element is configured to seat upon the upper peripheral aperture ridge formation.

In some embodiments, the tray-to-walker attachment mechanism is characterized by a plurality of resilient clip elements extending from at least two portions of said forward, rearward, and laterally opposed portions. In some embodiments, the resilient clip elements are attachable to first and second portions of the walker apparatus. In some embodiments, the plurality of resilient clip elements comprises paired sets of clip elements, each paired set of clip elements extending from at least two portions of said forward, rearward, and laterally opposed portions. In some embodiments, each paired set of clip elements extend from a main clip body. In some embodiments, each main clip body is pivotally attached to the laterally opposed portions such that the tray support portion is pivotal intermediate an object support configuration characterized by a horizontal orientation and a collapsed configuration characterized by at least a partially vertical orientation.

BRIEF DESCRIPTION OF THE DRAWINGS

Other features and objectives of the presently disclosed subject matter will become more evident from a consideration of the following brief descriptions of patent drawings.

DETAILED DESCRIPTION OF THE EMBODIMENTS

Figure 1:
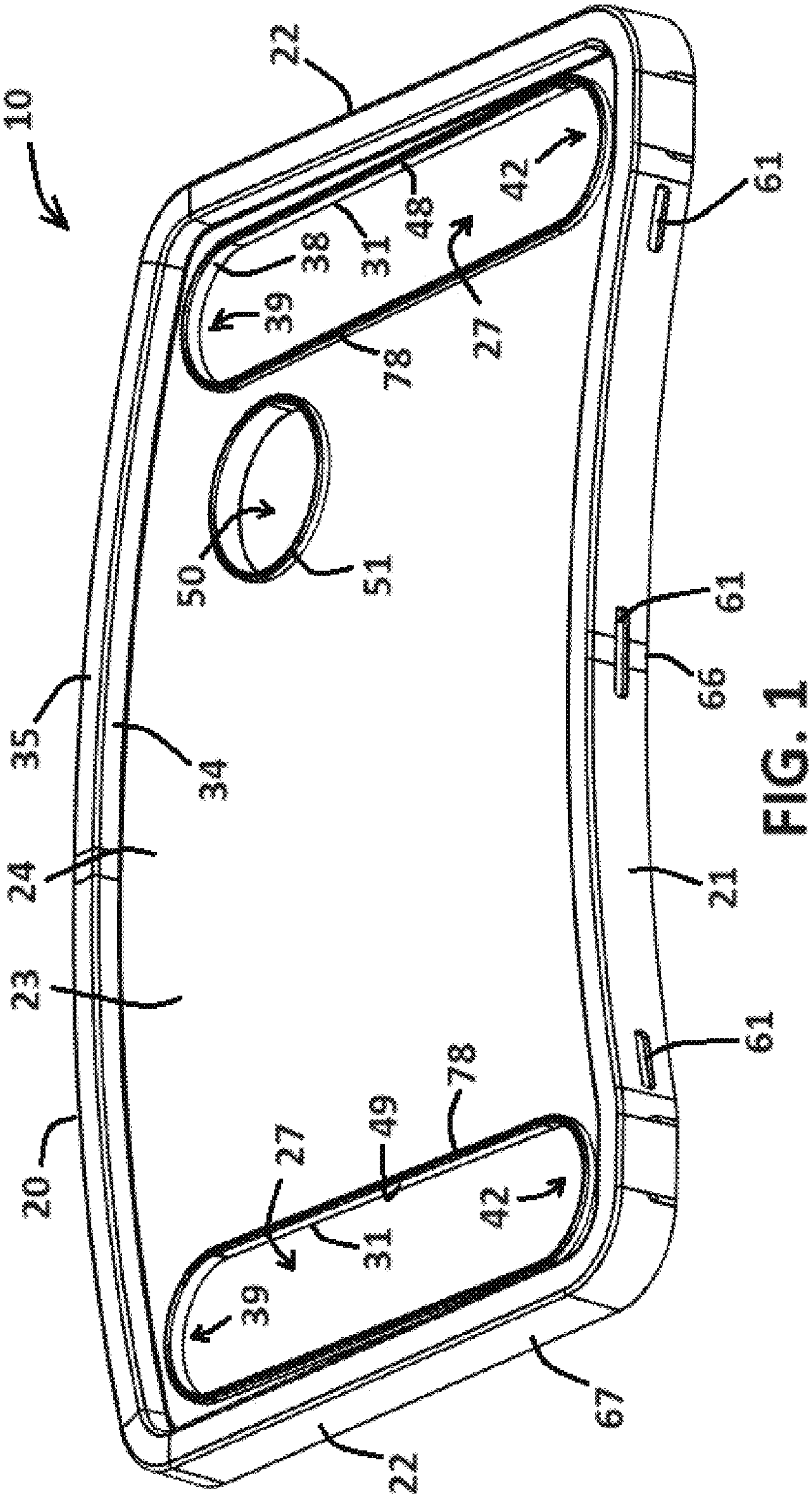
FIG. 1 is a first top perspective view of a first walker tray according to the presently disclosed subject matter as viewed from a first lateral edge of the first walker tray.
Figure 2:
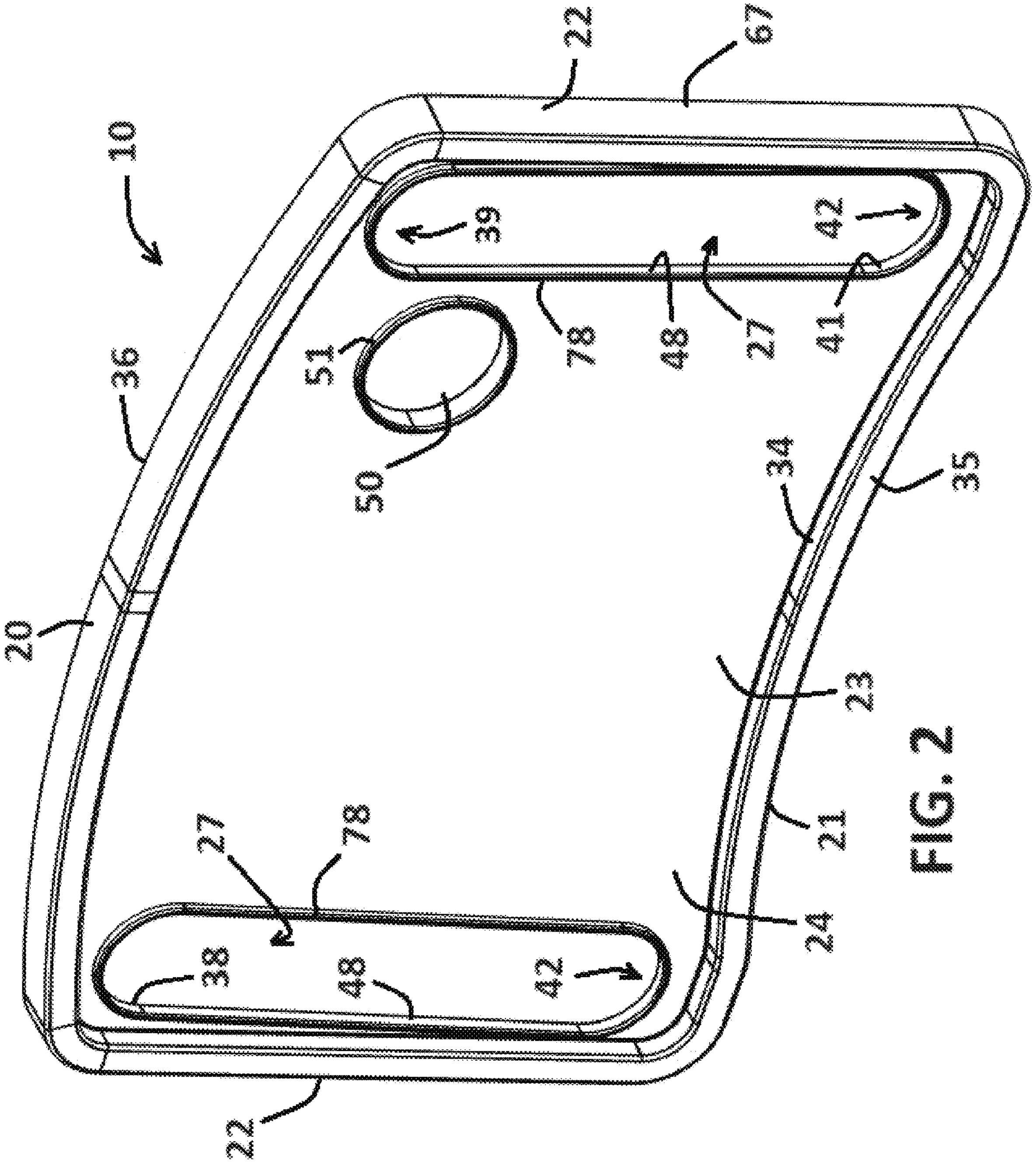
FIG. 2 is a second top perspective view of the first walker tray according to the presently disclosed subject matter as viewed from a second lateral edge of the first walker tray.
Figure 3:
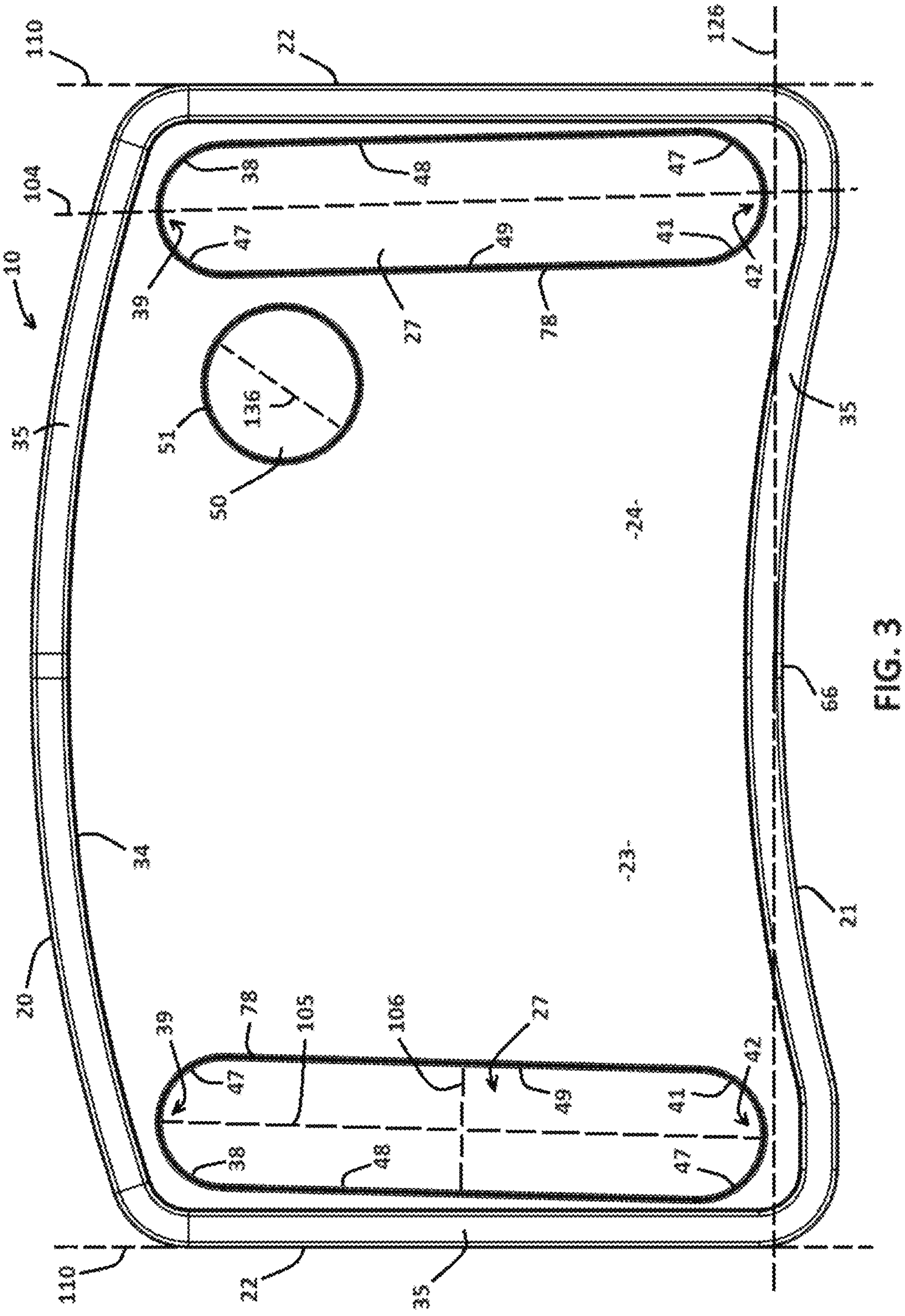
FIG. 3 is a first top plan view of the first walker tray according to the presently disclosed subject matter.

Referring now to the drawings with more specificity, the presently disclosed subject matter provides a first walker tray as generally depicted and referenced at 10 in FIGS. 1-10, 20, 21, and 26A-28. A second walker tray according to the presently disclosed subject matter is generally depicted and referenced at 70 in FIGS. 29-32. A more traditional, generic walker tray is generally depicted and referenced at 90 for comparison purposes. The primary purpose of the walker trays 10/70/90 is to provide the user 200 with a means to safely carry tray-supported items such as a plate of food, drinks, books and other daily items from one point to another whilst keeping their hands free to grab handle portions 12 of a walker apparatus 11.

Figure 24C:
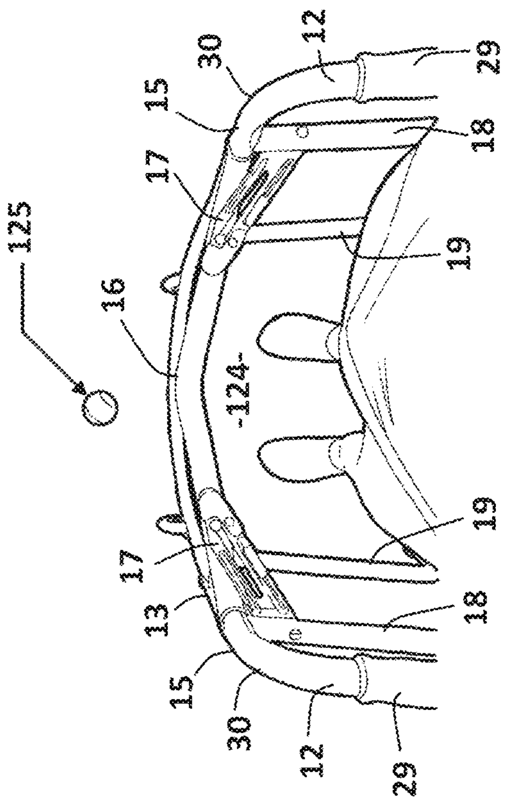
FIG. 24C is a third sequential depiction and perspective view of the user looking downwardly toward an object on the floor in a forward direction relative to the walker apparatus while the user is positioned in the space defined by the walker apparatus.
Figure 24B:
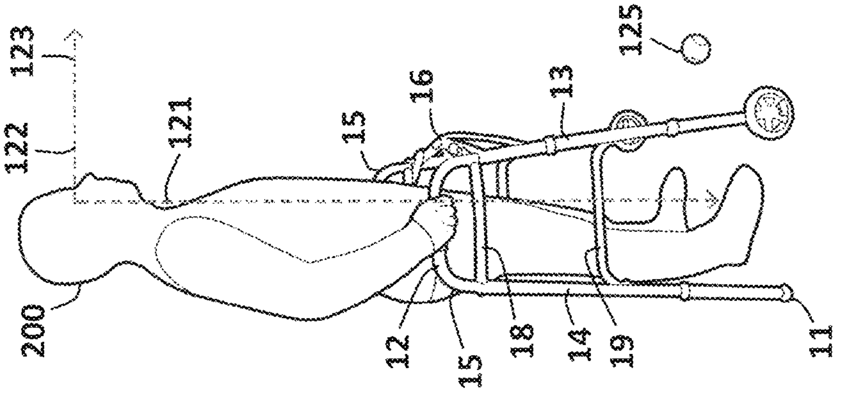
FIG. 24B is a second sequential depiction of a user positioned at a second position relative to a generic walker apparatus after stepping forward into the space defined by the walker apparatus.

While the user 200 is able to gain a hands-free and reliable way for transporting tray-supported items from one place to another, they are required to modify the way they use the walker apparatus 11 when a more traditional, generic walker tray 90 is installed. A user 200 is enabled to walk with the walker apparatus 11 or walking aid frame surrounding their front and sides and their hands and arms provide additional support by holding on to the top of the sides of the frame at handle portions 12 of the walker apparatus 11 as generally depicted in FIGS. 24A through 24C.

Figure 24A:
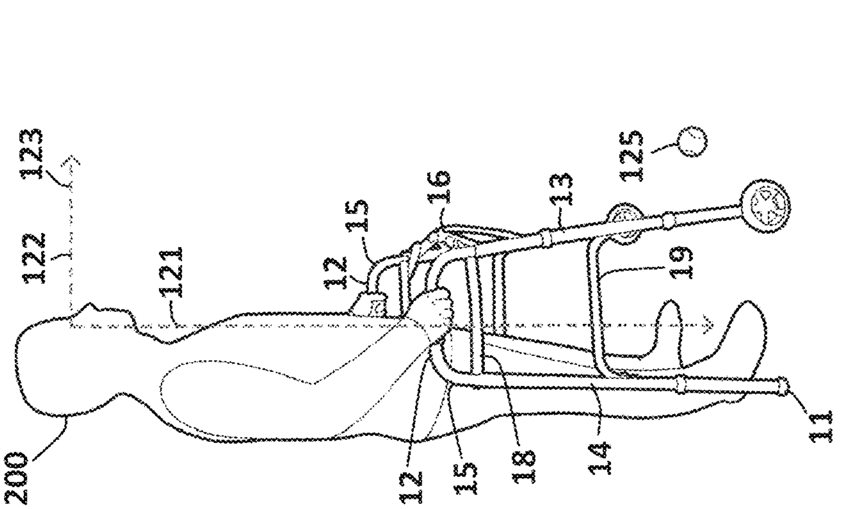
FIG. 24A is a first sequential depiction of a user positioned at a first position rearward of a generic walker apparatus before stepping forward into a space defined by the walker apparatus.
Figure 25A:
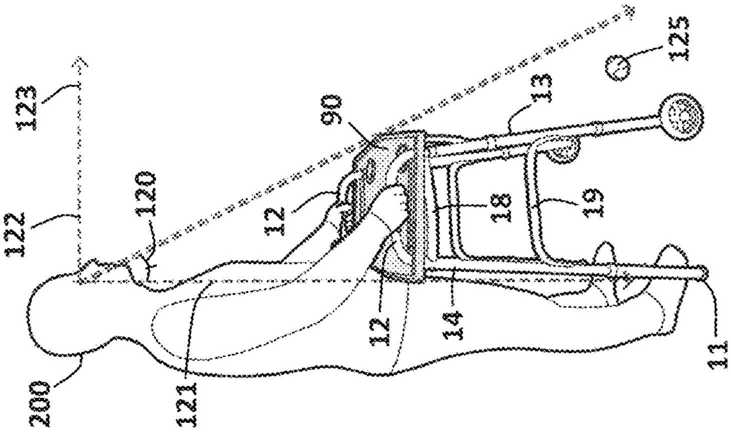
FIG. 25A is a first sequential depiction of a user positioned at a first position rearward of a generic walker apparatus outfitted with a generic walker tray with a user looking in a forward direction.
Figure 25B:
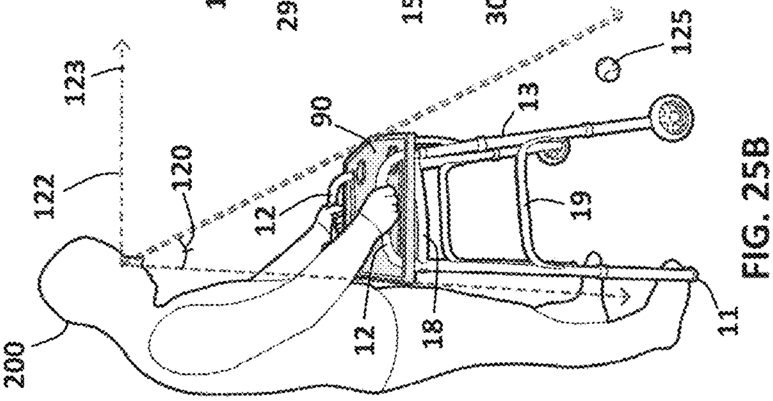
FIG. 25B is a second sequential depiction of a user positioned at the first position otherwise depicted in FIG. 25A wherein the user is looking downwardly in a forward direction to depict angled lines of eyesight relative to the generic walker tray.
Figure 25C:
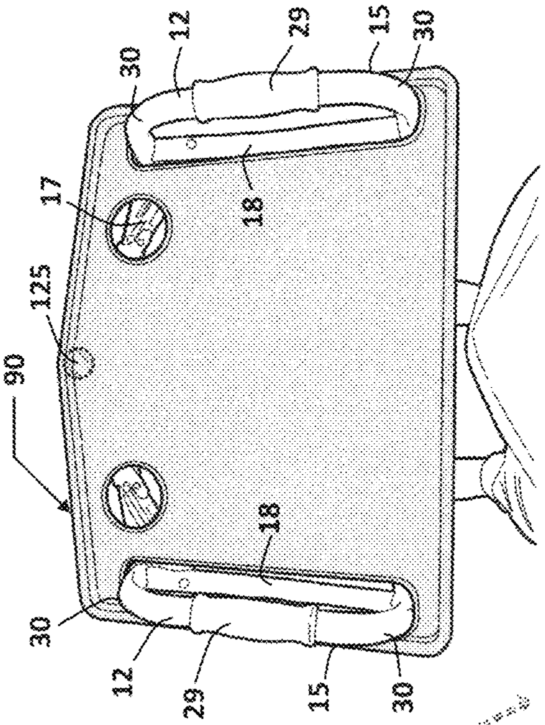
FIG. 25C is a third sequential depiction and perspective view of the user looking downwardly toward the generic walker tray otherwise depicted in FIGS. 25A and 25B along the sight lines otherwise depicted in FIG. 25B showing a hidden object on the floor.
Figure 26C:
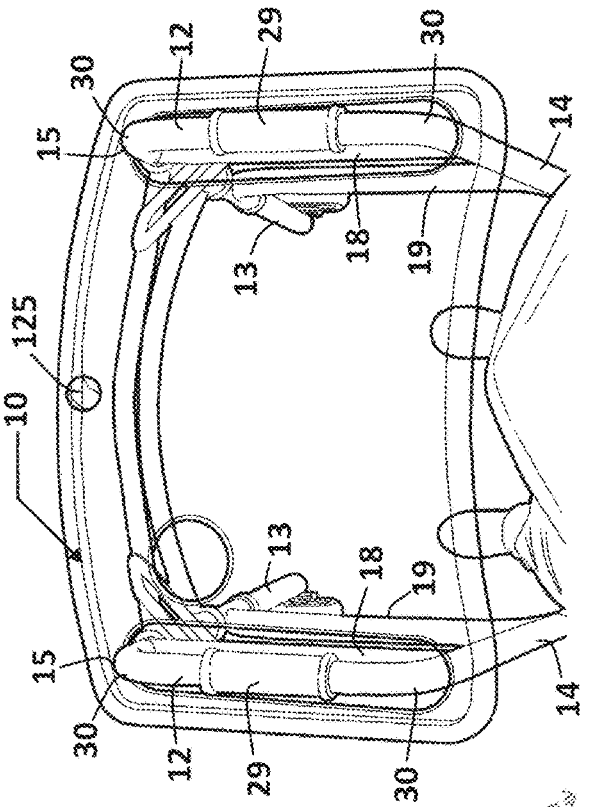
FIG. 26C is a third sequential depiction and perspective view of the user looking downwardly toward the first walker tray otherwise depicted in FIGS. 26A and 26B along the sight lines otherwise depicted in FIG. 26B showing an object on the floor visible through the first walker tray.
Figure 26B:
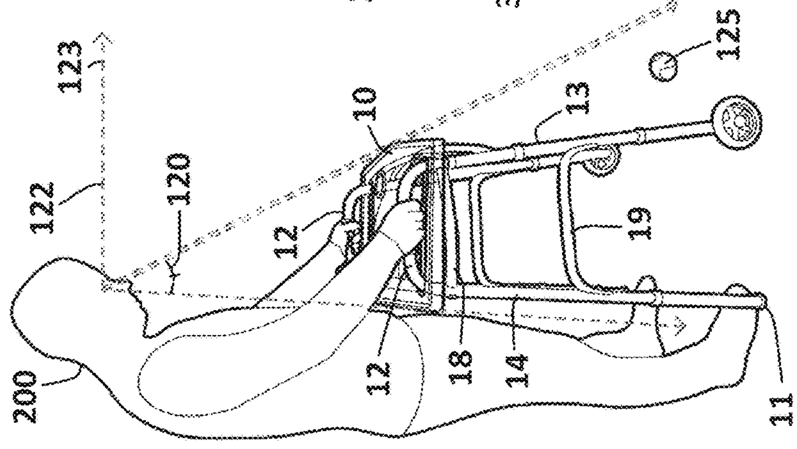
FIG. 26B is a second sequential depiction of a user positioned at the first position otherwise depicted in FIG. 26A and looking downwardly in a forward direction to depict angled lines of eyesight relative to the first walker tray according to the presently disclosed subject matter.
Figure 26A:
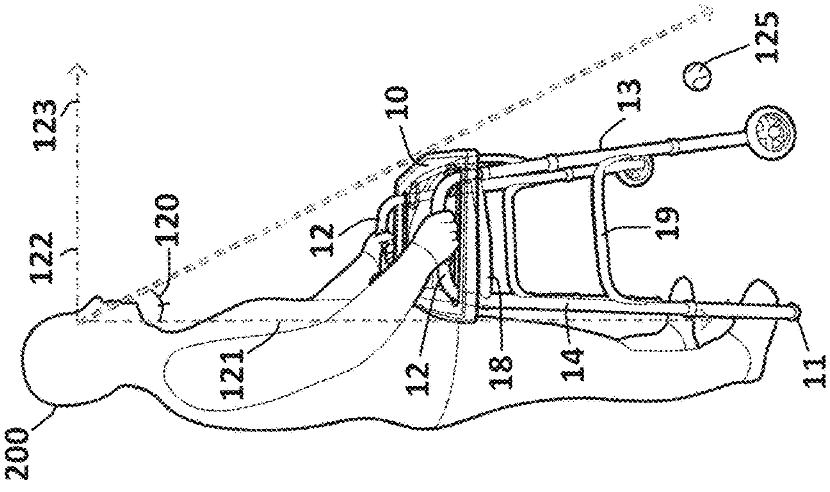
FIG. 26A is a first sequential depiction of a user positioned at a first position rearward of a generic walker apparatus outfitted with the first walker tray according to the presently disclosed subject matter wherein the user is looking in a forward direction.

In this regard, the reader is firstly and further directed to FIGS. 24A through 26C as compared to the views shown in FIGS. 25A through 25C. FIGS. 24A through 24C depict a user 200 with a generic walker apparatus 11 without a walker tray installed. FIGS. 25A through 25C depict a user 200 with a generic walker apparatus 11 with a generic walker tray 90 installed. More particularly, FIG. 24A depicts a user 200 standing behind the walker apparatus 11 in a relative forward position along a forward direction 123 for enabling the user 200 to advance in the forward direction 123 with the support of the walker apparatus 11. FIG. 24B depicts a user 200 repositioned within the space 124 defined by the walker apparatus frame in the forward direction 123. With a generic walker tray accessory 90 installed, the user 200 cannot use the walker apparatus 11 in its traditional and intended manner. Such generic walker trays 90, when installed, typically occupy the space 124 in which the user 200 would normally stand thereby forcing the user 200 to stand behind the walker apparatus 11 as generally and comparatively depicted in FIGS. 25A through 25C.

In other words, generic walker trays 90 force the user 200 to position themselves outside the space 124 defined by the walker apparatus frame defined laterally by side support rails or upright leg arrangements 15 and in the forward direction 123 by a cross member arrangement as at 16. This structural configuration of generic walker trays 90 positions the user 200 well behind the walker apparatus 11, which firstly increases the forward and downward viewing angle 120 relative to the vertical plane 121 orthogonal to the horizontal plane 122 as generally and comparatively depicted in FIGS. 25A and 25B. Generic walker trays 90 are also formed from fully opaque materials thereby further reducing visibility and increasing the forward and downward viewing angle 120 relative to the vertical plane 121. This increased forward and downward viewing angle 120 reduces visibility and increases a user's risk of tripping and potentially falling due to this limited visibility. It will thus be understood generic walker trays 90 increase safety concerns for users 200.

It is further noted that many generic walker trays 90 have not been properly engineered to fit multiple styles and brands of walkers 11. Although at first glance many walkers 11 appear the same or similar, there are typically some slight differences in their physical design. One of these design differences stems from the configuration of the side support rails or upright leg arrangements 15 with upper handle portions 12. More particularly, the design differences stem from the overall width between the side support rails or upright leg arrangements 15, the depth from front to back of the walker frame, and the angle of the side support rails or upright leg arrangements 15 relative to the forward direction 123.

At least these design differences impact how a generic walker tray 90 will fit onto the walker apparatus 11. To overcome these perceived shortcomings of generic walker trays 90, the first walker tray 10 according to the presently disclosed subject matter is configured to include an inwardly reduced radius on the rearward edge 21 opposite the user 200. The reduced radius allows the user 200 to stand relative closer to the walker apparatus 11 toward the space 124 thereby positioning the user 200 closer to the walker frame for more proper walker use and reducing the forward and downward viewing angle 120 while still providing the convenience of the first walker tray 10.

The first walker tray 10 is designed to be mounted or installed upon a walker apparatus as variously depicted and referenced at 11. In some embodiments, the first walker tray 10 comprises a first tray-to-walker attachment mechanism configured to removably attach the first walker tray 10 to the walker apparatus 11 so as to position a tray support portion 23 thereof in a support plane so as to provide a horizontal support surface for enabling a user to support items thereupon. More particularly, the first walker tray 10 according to the presently disclosed subject matter is configured to removably seat down upon and be supported by the walker apparatus 11.

The weight 100 of the first walker tray 10 is directed downwardly such that portions of the walker apparatus 11 engage cooperative portions of the first walker tray 10 configured to support the first walker tray 10 during use thereof. Referencing FIG. 4, the reader will there see the weight is directed downwardly as at arrow 100 with weight-opposing support vectors being referenced at 101 originating from tray-to-walker engagement points described in more detail hereunder. Accordingly, in some embodiments, the first tray-to-walker attachment mechanism may be characterized by a pair of laterally opposed handle-receiving apertures 27 extending through the tray support portion 23 inwardly adjacent the laterally opposed edges 22 of the first walker tray 10, each of which extend along an aperture plane 104 intersecting the forward and rearward edges 20 and 21 of the first walker tray 10.

Figure 4:
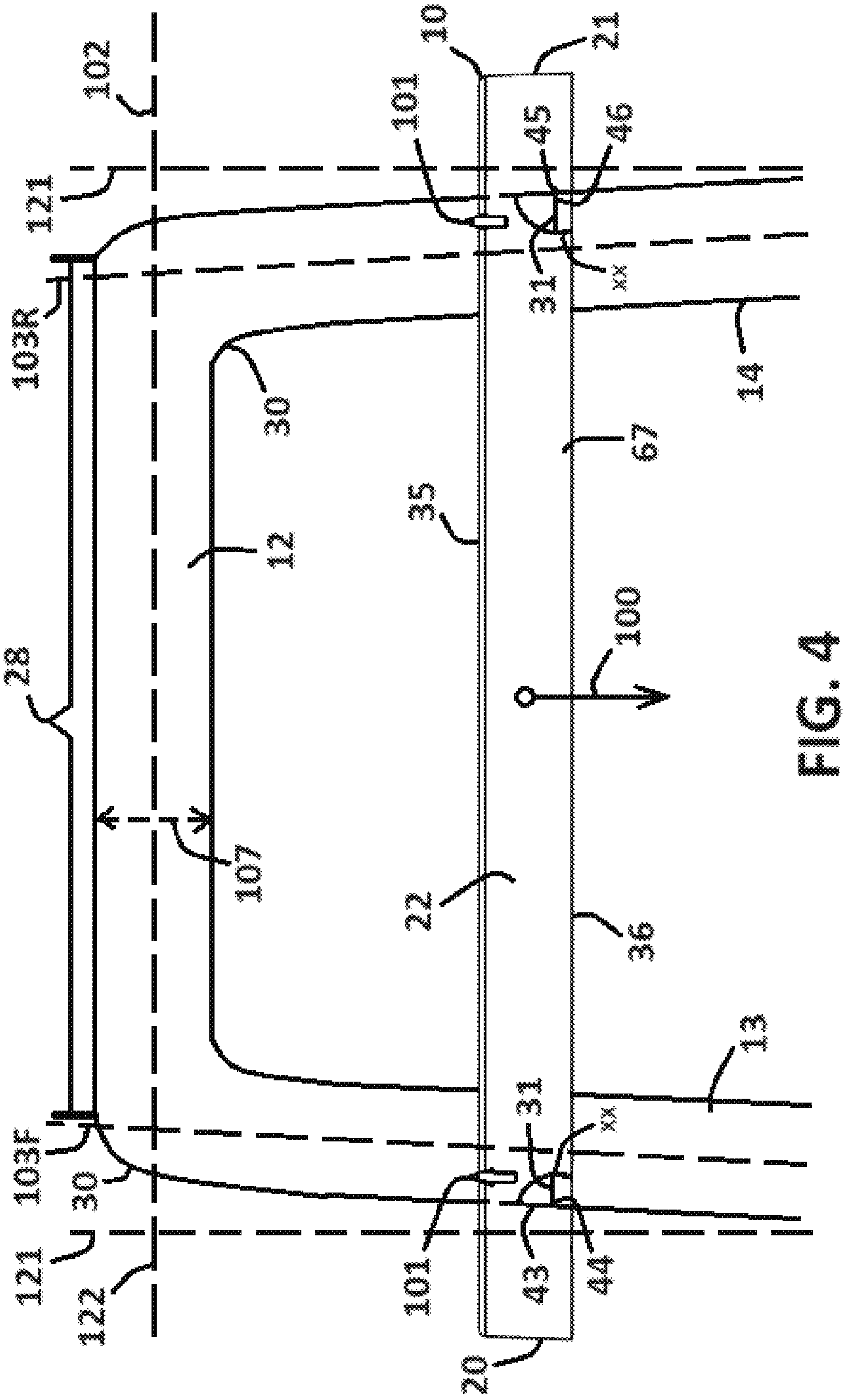
FIG. 4 is a diagrammatic lateral view depiction of the first walker tray according to the presently disclosed subject matter shown installed upon upper portions of a walker apparatus with parts of the first walker tray broken away at "xx" to reveal otherwise hidden engagement points between the first walker tray and the walker apparatus.

The walker apparatus 11 usable in combination with the first walker tray 10 according to the presently disclosed subject matter essentially comprises laterally opposable upper handle portions 12 each of which extend in a handle plane 102. In some embodiments, the handle planes 102 of each handle portion 12 are coplanar and substantially horizontal with the horizontal plane 122 as generally depicted in FIG. 4. In some embodiments, the handle plane(s) 102 are slightly obliquely angled relative to the horizontal as comparatively depicted in FIG. 28. Each handle portion 12 is supported within a respective handle plane 102 by way of a forward leg 13 and a rearward leg 14.

Accordingly, in certain applications, the walker apparatus 11 comprises two forward legs 13 and two rearward legs 14. Together the forward legs 13 and rearward legs 14 support the handle portions 12 within the handle plane(s) 102. The walker apparatus 11 may also be said to comprise laterally opposed upright leg arrangements 15 each of which comprise from front to back: a forward leg 13, a handle portion 12, and a rearward leg 14 such that the handle portion 12 interconnects the forward leg 13 and the rearward leg 14 of each upright leg arrangement 15 at upper portions thereof.

In some embodiments, the first walker tray 10 according to the presently disclosed subject matter is designed to cooperate with a walker apparatus 11 generally formed from a tubular structural material as exemplified by tubular steel or aluminum having a generally uniform cross-sectional diameter as at 107 along the handle portions 12, the forward leg portions 13 and the rearward leg portions 14 particularly at the upper portions of the upright leg arrangements 15. In some embodiments, the forward legs 13 extend in a forward leg plane 103F and the rearward legs 14 extend in a rearward leg plane 103R, which leg planes 103F and 103R are angled relative to one another and a vertical plane as at 121.

In some embodiments, the leg planes 103F and 103R are obliquely angled relative to one another so as to be non-parallel and the first walker tray 10 is configured to cooperate with this particular structural configuration such that inner leg-engaging edge 31 portions of the handle-receiving apertures 27 of the first walker tray 10 engage outer surfacing of the obliquely angled forward and rearward leg portions 13 and 14. The outer surfacing of the forward and rearward leg portions 13 and 14 thereby provide opposed surfacing of wedge-like elements that together operate to wedge-support the first walker tray 10 upon the walker apparatus 11 as it seats down and is installed upon upper portions of the upright leg arrangements 15 of the walker apparatus 11.

As illustrated in the drawing support accompanying this application, the walker apparatus 11 may, in some embodiments, comprises a cross-member arrangement 16 extending intermediate the forward legs 13, which forward legs 13 are pivotally attached to the cross-member arrangement 16 of each upright leg arrangement. Laterally opposed pivot limiter elements 17 are connected to the cross-member arrangement 16 and an upper crossbar 18 of each upright leg arrangement 15.

The upper crossbars 18 extend intermediate the forward leg 13 and the rearward leg 14 of each upright leg arrangement 15 in inferior adjacency to the handle portion 12 in substantially parallel relation thereto. Each upright leg arrangement 15 may further comprise a lower crossbar 19. The lower crossbars 19 extend intermediate the forward legs 13 and the rearward legs 14 of each upright leg arrangement 15 in inferior adjacency to the upper crossbar 18 in substantially parallel relation thereto.

In some embodiments, the upright leg arrangements 15 are pivotal about a pivot axis of rotation extending through the forward legs 13 at opposite ends of the cross-member arrangement 16. The upright leg arrangements 15 are pivotal so as to allow the user 200 to pivot the same about the pivot axes of rotation in a first rotational direction for configuring the walker apparatus into a first, usage state as generally depicted in FIGS. 24A through 28 and further about the pivot axes of rotation in a direction opposite the first direction for collapsing the walker apparatus 11 into a second, stowage or collapsed state (not specifically illustrated). The first walker tray 10 according to the presently disclosed subject matter is attachable to the walker apparatus 11 when in the first, usage state and removable therefrom before reconfiguring the walker apparatus 11 into the second, stowage or collapsed state.

In some embodiments, the first walker tray 10 according to the presently disclosed subject matter comprises or is formed from a material suitable for injection-molding formation. In some embodiments, the material may be polycarbonate or acrylic. Such materials enable injection molding processes and provide a lightweight yet durable material construction. They may further provide light-transmittance through the first walker tray 10 and an ability to add a wide range of color tones to the material while maintaining light-transmittivity thereof for enabling a user 200 to see through at least a portion of the first walker tray 10 to see or visibly perceive objects thereunder as exemplified by a ball as at 125.

While it is here noted that a preferred manufacturing process for the first walker tray 10 is by way of an injection-molding process, this should not be construed as limiting but rather exemplary. Other types of suitable manufacturing processes include, but are not limited to CNC machining, thermoset manufacturing, rotational molding, thermoforming, 3D printing, extrusion, and vacuum forming processes, the last of which is notably one of the most widely-used methods of thermoforming, a common alternative to injection molding.

A further design solution is embodied in the handle-receiving apertures 27 of the first walker tray 10 particularly configured to structurally cooperate with differing frame widths, depths and angles of side support rails or upright leg arrangements 15 of walker apparatuses 11 available on the market. Although the drawing support submitted in support of these specifications show a certain offset angle 111 of the handle-receiving apertures 27 relative to the forward direction 123, the offset angle 111 can be adjusted as needed to fit any brand of walker apparatus 11 as either currently offered or as provided by future offerings.

The first walker tray 10 as formed from any suitable material comprises a forward edge or side 20, a rearward edge or side 21, laterally opposed edges or sides 22, and a tray support portion 23 extending intermediate the forward edge 20, rearward edge 21, and laterally opposed edges 22. In some embodiments, the forward edge 20 comprises a forward edge radius and the rearward edge 21 comprises a rearward edge radius. In some embodiments, the forward and rearward radii are convex relative to a user 200 positioned opposite the rearward edge 21.

In some embodiments, the rearward edge radius is lesser than the forward edge radius and minimized so as to enable a user 200 to position oneself toward the space 124 defined by the upright leg arrangements 15 and the cross-member arrangement 16. In some embodiments, the rearward edge 21 comprises a midpoint 66 equidistant intermediate the laterally opposed edges 22, which midpoint 66 extends along or within a rearward plane 126 extending along rearward ends 42 of the handle-receiving apertures 27 as depicted and referenced in FIG. 3.

In some embodiments, at least one of the forward edge 20, the rearward edge 21, and the laterally opposed edges 22 comprises a hanger mechanism for enabling a user 200 to hang a utility bag as at 60 or other hangable items upon the first walker tray 10. In some embodiments, the hanger mechanism may be characterized by at least one of a strap-receiving aperture as at 61 and a loop supporting hook member as at 62.

In other words, in some embodiments, the first walker tray 10 may comprise or include integrally molded hook members 62. As illustrated, the hook members 62 are positioned along the rearward edge 21 adjacent the laterally opposed edges 22. However, the hook members 62 may be located on any of the forward, rearward or laterally opposed edges 20, 21, 22 of the first walker tray 10 according to the presently disclosed subject matter.

It is noted that many users 200 of walker apparatuses 11 are inclined to purchase an accessory or utility bag as at 60 that may be hung from the frame of the walker apparatus 11. Typically, these accessory or utility bags 60 are hung from one of the sides or the front of the frame. This mounting location requires the user 200, once seated, to move the walker apparatus 11 to gain access to the bag 60. This can be difficult for some users 200 who lack upper body strength.

By adding an accessory mounting hanger mechanism as exemplified by strap-receiving apertures 61 or hook members 62 on the rearward edge 21 opposite the user 200, the bag 60 may face the user 200 once seated and does not require the user to manipulate the walker apparatus 11 to gain access to the storage pockets as at 63. Straps 64 of the utility bag 60 may be inserted through the strap-receiving apertures 61 and around the rearward legs 14 to hang the utility bag 60 from the first walker tray 10 and attach the same to the walker apparatus 11. The utility bag 60 may further comprise other attachment mechanisms such as a loop member as at 65 in FIG. 27.

Central to the practice of the invention is the tray support portion 23, which extends intermediate the forward edge 20, the rearward edge 21 and the laterally opposed edges 22 and is configured to support objects placed thereupon (not specifically illustrated). The tray support portion 23 comprises an upper tray surface 24 and a lower tray surface 25 with a substantially uniform tray support thickness 26 extending therebetween. In some embodiments, the tray support portion 23 is substantially planar with a substantially uniform tray thickness 26 within a thickness range of 3 to 5 millimeters. In some embodiments, at least the tray support portion 23 is formed from a light-transmissive material for allowing light to pass therethrough and for enabling a user 200 to see through at least the tray support portion 23 as described hereinabove. Together the uniform tray thickness 26 and the light-transmissive material provide a preferred item support function and preferred light-transmittance based on properties of the material used in the formation thereof.

In some embodiments, the first walker tray 10 may be formed by way of an injection molding process and accordingly, in some embodiments, the entirety of the first walker tray 10 is formed from a light-transmissive material for allowing light to pass therethrough, including the forward edge 20, the rearward edge 21, the laterally opposed edges 22, and the tray support portion 23. In some embodiments, at least the tray support portion 23 is formed from a colored light-transmissive material for coloring and altering a light-transmittance thereof. In some embodiments, for example, the colored light-transmissive material may be of blue coloration as depicted at hatch marking 55 in FIG. 5A, and in some embodiments the colored light-transmissive material may be of purple coloration as depicted at hatch marking 56 in FIG. 5B.

In this last regard, it is noted the visible spectrum is the band of the electromagnetic spectrum that is visible to the human eye. Electromagnetic radiation within this range of wavelengths is called visible light or more simply "light". A typical human eye will respond to wavelengths from about 380 nanometers (at the ultraviolet end of the spectrum) to about 750 nanometers at (the infrared end of the spectrum). As earlier stated, one possible material for the walker tray is polycarbonate, which exhibits roughly 85% to 90% transmission of visible light within the visible spectrum. Another possible material for the first walker tray 10 is acrylic, which exhibits roughly 92% transmission of visible light within the visible spectrum.

Accordingly, in some embodiments, the first walker tray 10 and at least the tray support portion 23 may be said to exhibit light transmittance within this range and thus may be said to provide a translucent walker tray or at least a translucent tray support portion 23 for enabling users 200 to see therethrough while simultaneously providing some limited degree of non-transparency or opacity so that users 200 are able to visibly discern the structure of the first walker tray 10. While other materials may be used in the formation of the first walker tray 10, a central aspect of the presently disclosed subject matter is to provide a tray support portion 23 that provides translucency for enabling a user 200 to see through at least a portion of the first walker tray 10 for improving overall safety of use of a walker apparatus 11 with the first walker tray 10 installed thereupon.

The first walker tray 10 according to the presently disclosed subject matter further comprises a pair of laterally opposed handle-receiving apertures 27 extending through the tray support portion 23 inwardly adjacent the laterally opposed edges 22 each of which extend along an aperture plane 104 intersecting the forward and rearward edges 20 and 21. Each of the handle-receiving apertures 27 have an aperture length 105 extending along the aperture planes 104 and an aperture width 106 extending orthogonally relative to the aperture planes 104. In some embodiments, the aperture lengths 105 of the handle-receiving apertures 27 are of a uniform dimension or the same, and in some embodiments, the aperture widths 106 of each handle-receiving aperture 27 are of a uniform dimension or the same.

The aperture lengths 105 are greater than a handle portion length 28 of each handle portion 12 and the aperture widths 106 are greater than the cross-sectional diameter as at 107 of the handle portions 12. In some embodiments, the handle portions 12 may be outfitted with a hand grip as at 29 in FIGS. 24C, 25C, 26C, and 28. The aperture widths 106 are also greater than a width of the hand grips 29. The aperture lengths 105 and aperture widths 106 are thus configured to receive at least the upper handle portions 12 through the handle-receiving apertures 27. In some embodiments, the forward legs 13 and rearward legs 14 are coextensive with the handle portions 12 of each upright leg arrangement 15. In some embodiments, radiused portions 30 extend from opposed ends of the handle portion 12 intermediate upper portions of the forward leg 13 and rearward leg 14 of each upright leg arrangement 15.

Each of the handle-receiving apertures 27 are defined inwardly by an inner leg-engaging edge 31 configured to engage at least a forward leg portion 32 of each of the forward legs 13 and a rearward leg portion 33 of each of the rearward legs 14. The handle portions 12 and radiused portions 30 are receivable in and through the handle-receiving apertures 27 and the first walker tray 10 may be directed downwardly along the upper portions of the forward and rearward legs 13 and 14 until the inner leg-engaging edge 31 engages at least a forward leg portion 32 and a rearward leg portion 33.

It will be recalled the forward legs 13 are angled relative to the rearward legs 14 and as the first walker tray 10 travels downwardly along the length of the forward and rearward legs 13 and 14 it reaches a point where the inner leg-engaging edge 31 engages at least a forward leg portion 32 and a rearward leg portion 33 such that the forward and rearward leg portions 32 and 33 engage the inner leg-engaging edge 31 for wedge-supporting the first walker tray 10 upon the walker apparatus 11 in some embodiments. The weight-opposing support vectors referenced at 101 originate from tray-to-walker engagement points characterized by contact between the forward and rearward leg portions 32 and 33 and the inner leg-engaging edge 31.

In some embodiments, the first walker tray 10 according to the presently disclosed subject matter further comprises an upper peripheral edge ridge formation 34 extending along the forward edge 20, the rearward edge 21, and laterally opposed edges 22 such that an upper edge portion 35 of the upper peripheral edge ridge formation 34 extends in an upper edge plane 108 in parallel relation to the upper tray surface 24. In some embodiments, the first walker tray 10 further comprises a bottom edge 36 extending in a bottom edge plane 109 parallel to the upper ridge plane 108, the upper tray surface 24, and the lower tray surface 25.

In other words, the tray support portion 23 extends intermediate the upper peripheral edge ridge formation 34, which terminates upwardly at the upper edge portion 35. The forward edge 20, the rearward edge 21, and laterally opposed edges 22 terminate downwardly at the bottom edge 36, which extends in the bottom edge plane 109 in spaced relation to the bottom tray surface 25 thereby providing a downwardly extending outer tray skirt 67 at the forward edge 20, the rearward edge 21, and the laterally opposed edges 22.

In some embodiments, the laterally opposed edges 22 of the first walker tray 10 are parallel to one another extending along edge planes 110 extending at least in the forward direction as generally depicted and referenced in FIGS. 3 and 5A through 6. In some embodiments, the aperture planes 104 are obliquely angled relative the laterally opposed edges 22 and edge planes 110 as further generally depicted in FIGS. 3 and 5A through 6. In some embodiments, the offset angle 111 intermediate the aperture planes 104 and the edge planes 110 is within an angle range of 1 to 5 degrees.

In some embodiments, the offset angle 111 is within a range of 2.5 to 3 degrees. The offset angle 111 helps support a universal fit for a variety of walkers or walker apparatuses 11 as some walker apparatuses 11 provide upright leg arrangements 11 that are parallel to one another as generally depicted in FIG. 5A whereas other walkers 11 provide or comprise upright leg arrangements 15 that are obliquely angled to one another, particularly when directed into the first, usage state as comparatively depicted in FIG. 5B.

Figure 5A:
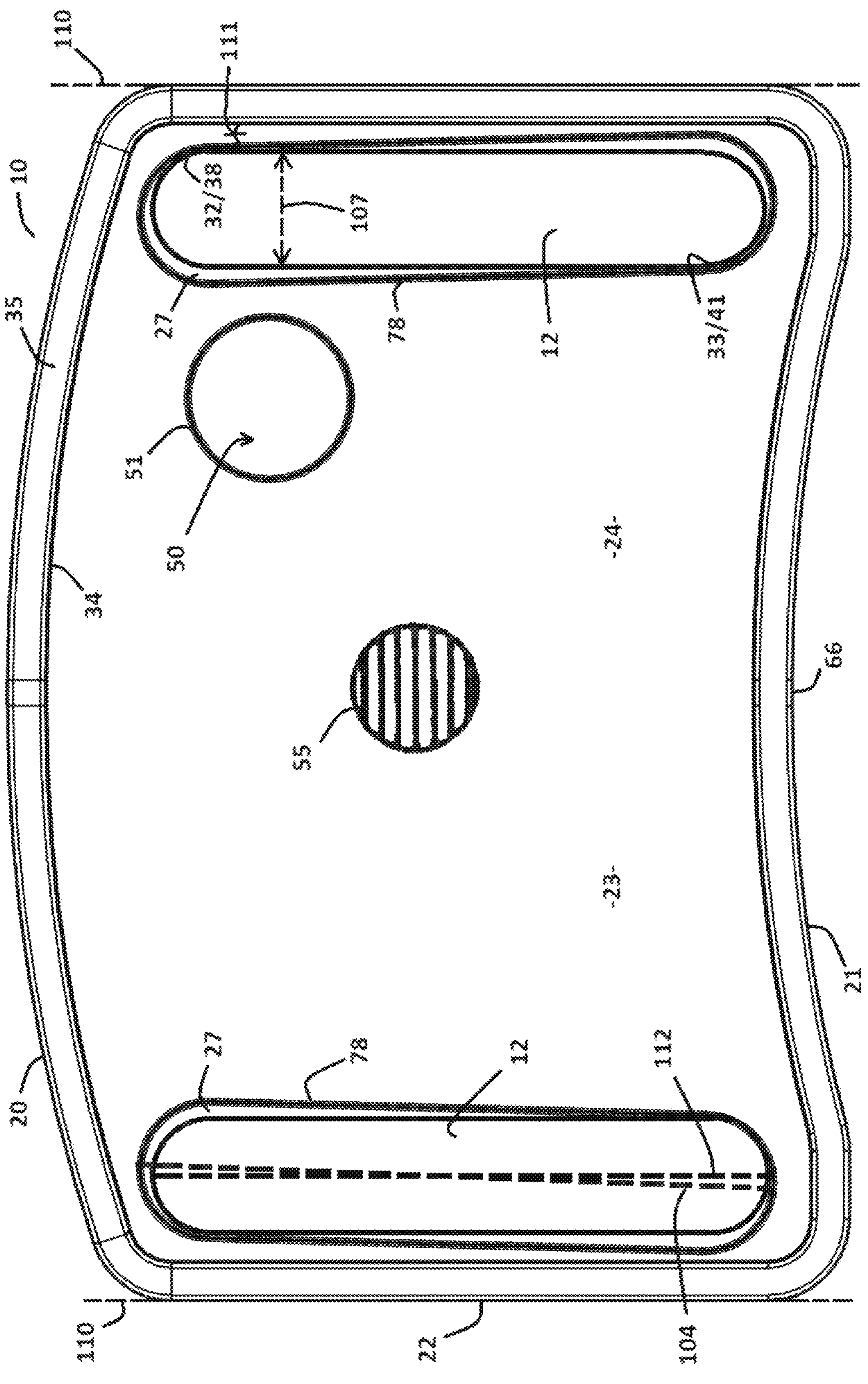
FIG. 5A is a second top plan view of the first walker tray according to the presently disclosed subject matter shown with a first coloration as mounted upon upper portions of a walker apparatus having parallel upright leg arrangements.
Figure 5B:
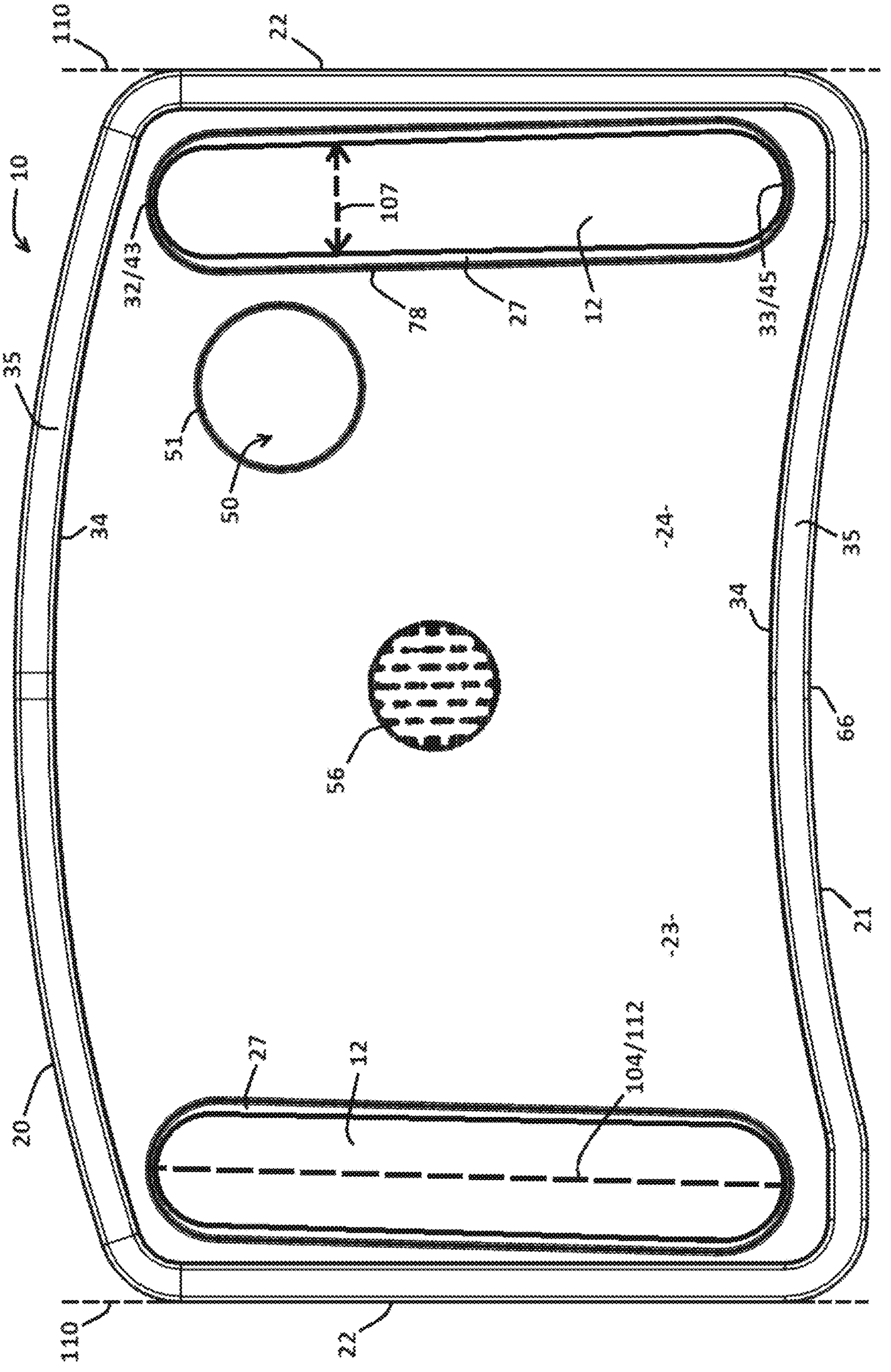
FIG. 5B is a third top plan view of the first walker tray according to the presently disclosed subject matter shown with a second coloration as mounted upon upper portions of a walker apparatus having obliquely angled upright leg arrangements.
Figure 6:
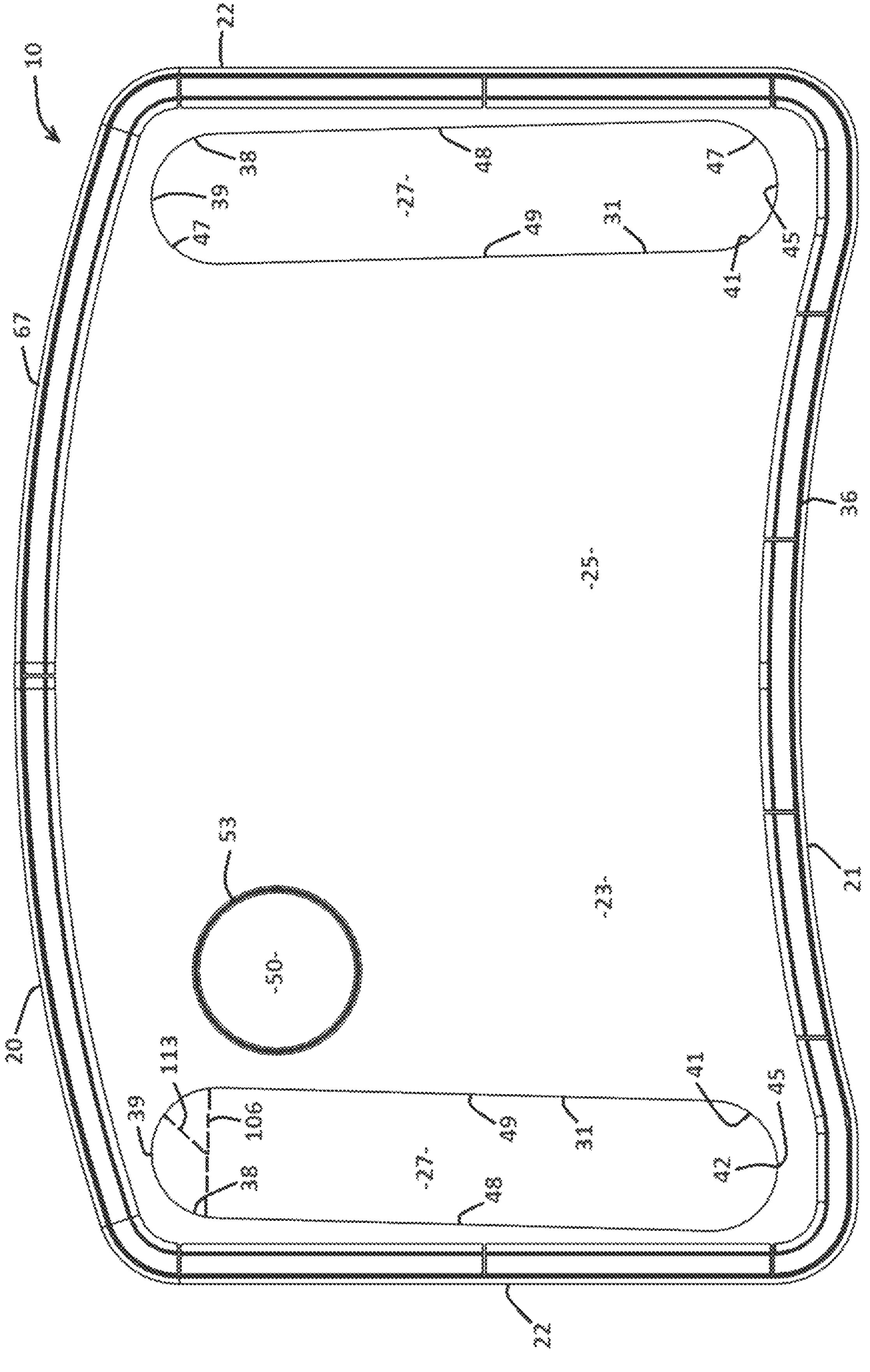
FIG. 6 is a bottom plan view of the first walker tray according to the presently disclosed subject matter.
Figure 7:
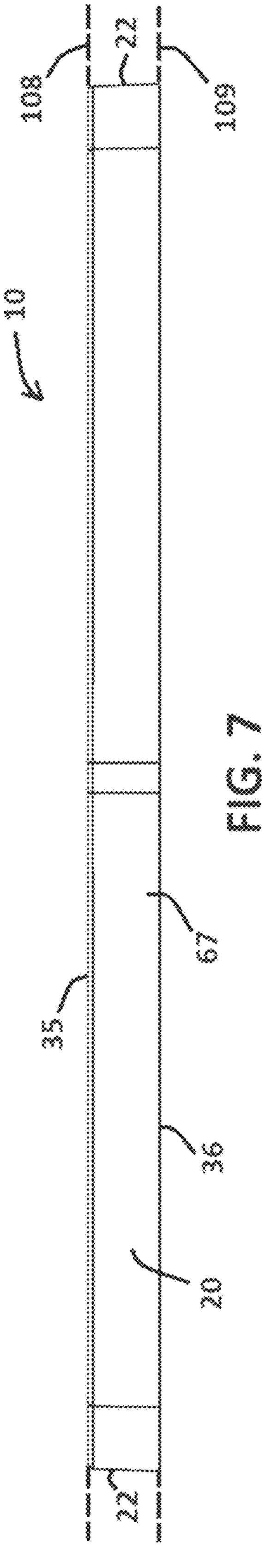
FIG. 7 is a forward edge view of the first walker tray according to the presently disclosed subject matter.
Figure 8:
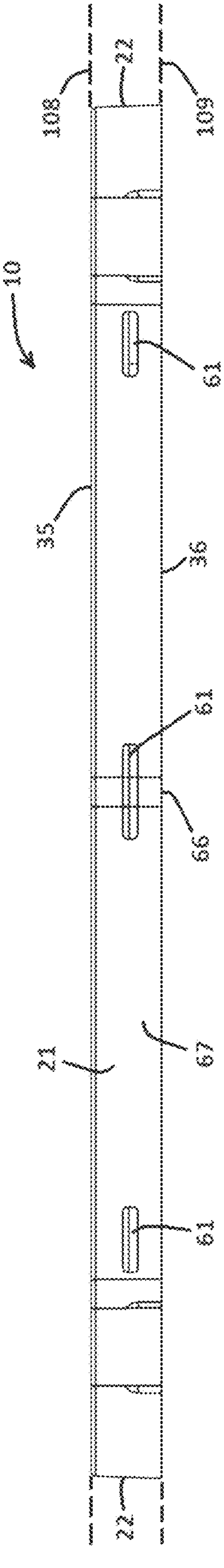
FIG. 8 is a rearward edge view of the first walker tray according to the presently disclosed subject matter.
Figure 9:
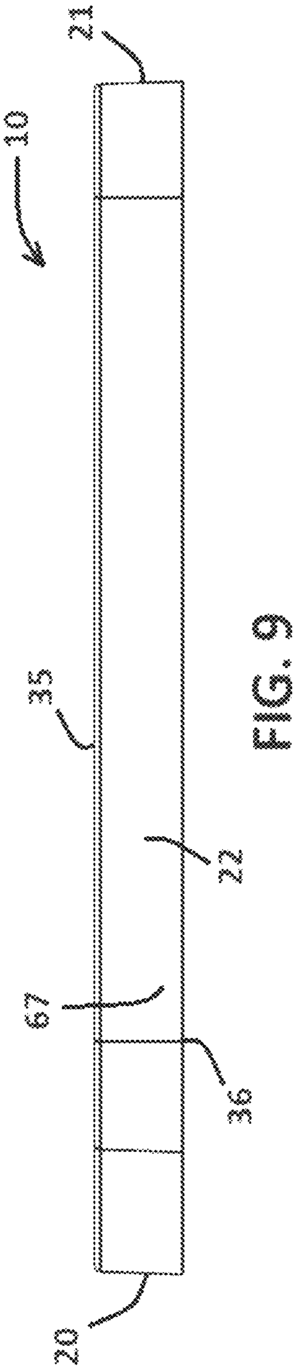
FIG. 9 is a first lateral edge view of the first walker tray according to the presently disclosed subject matter.
Figure 10:
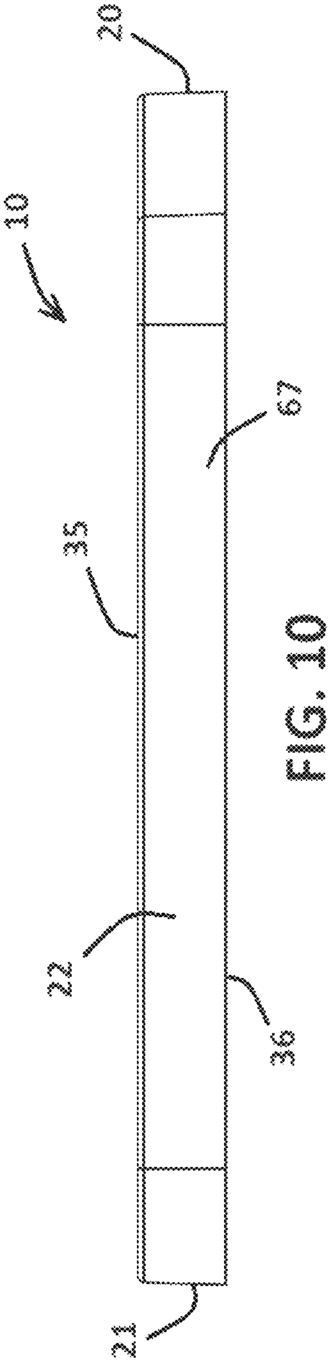
FIG. 10 is a second lateral edge view of the first walker tray according to the presently disclosed subject matter.
Figure 11:
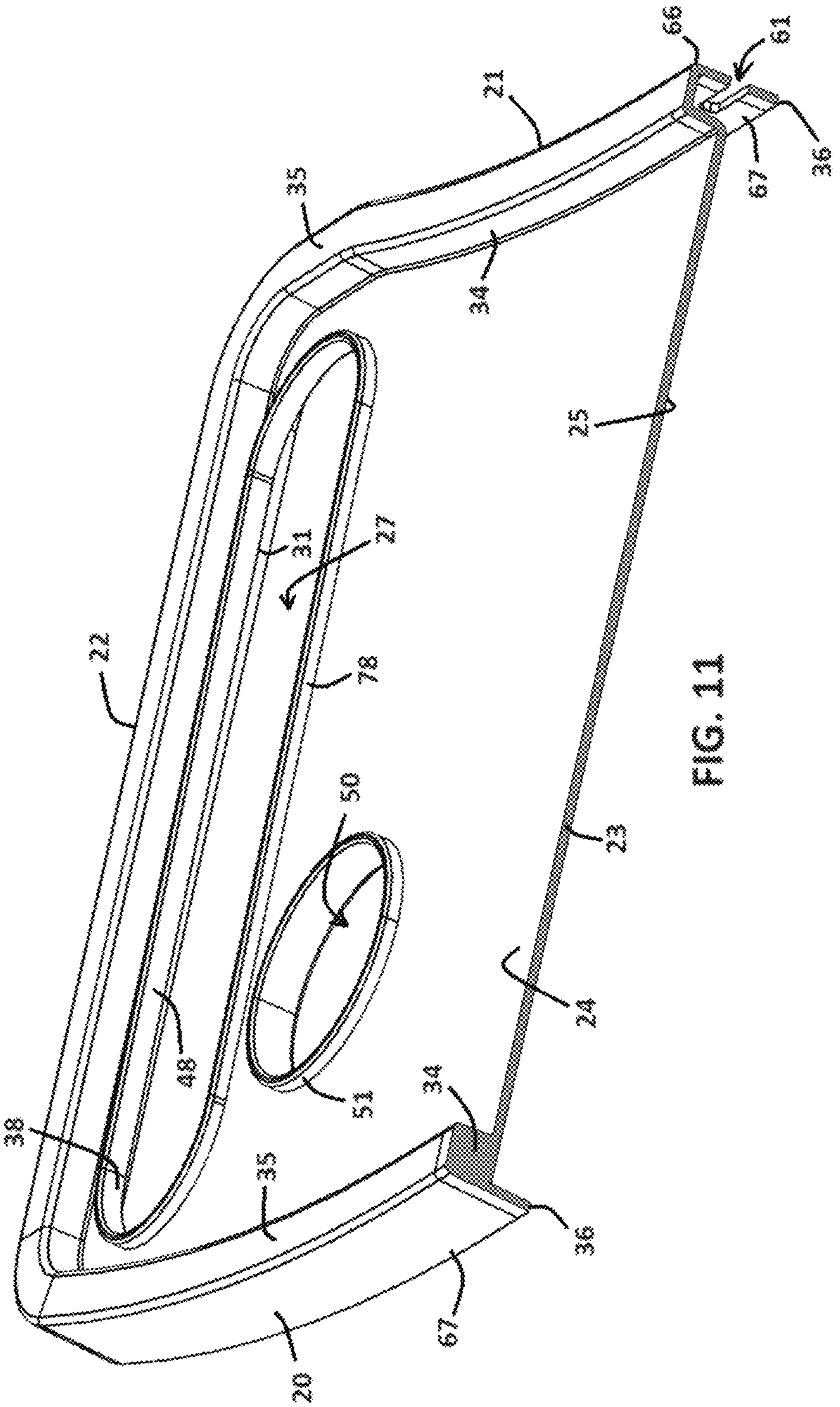
FIG. 11 is a top cross-sectional perspective view of the first walker tray according to the presently disclosed subject matter as sectioned along a plane extending equidistant intermediate the first and second lateral edges to show the planar structure of a tray support portion of the first walker tray.
Figure 12:
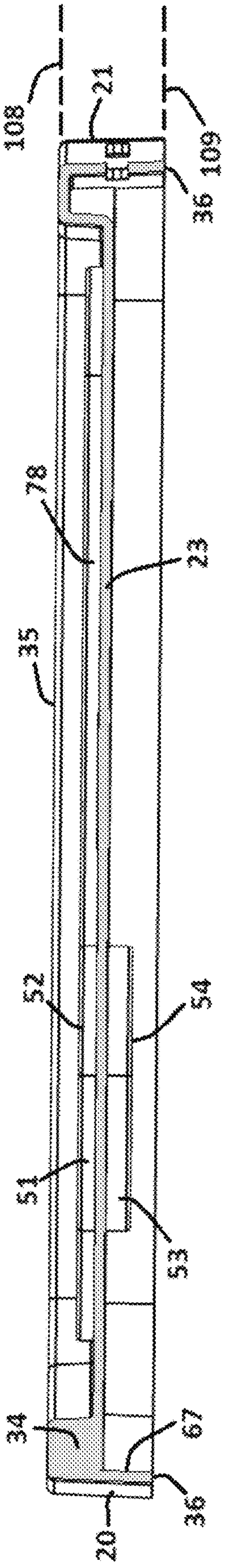
FIG. 12 is an internal edge view of the cross-section of the first walker tray otherwise depicted in FIG. 11.

The handle-receiving apertures 27 are configured so as to support the first walker tray 10 upon a walker apparatus 11 having either parallel laterally opposed upright leg arrangements 15 with handle portions 12 as depicted in FIG. 5A or angled laterally opposed leg arrangements 15 with handle portions 12 as depicted in FIG. 5B. Referencing FIG. 5A, the reader will there consider a walker apparatus 11 having parallel upright leg arrangements 15 with handle portions 12 in which the arrangement planes 112 are obliquely angled relative to the aperture planes 104 when the first walker tray 10 is mounted upon the walker apparatus 11.

Outer upper portions of the forward legs 13 engage outer portions 38 of the handle-receiving apertures 27 at forward ends 39 along the inner leg-engaging edge 31 while inner upper portions of the rearward legs 14 engage inner portions 41 of the handle-receiving apertures 27 at rearward ends 42 along the inner leg-engaging edge 31. The forward leg portions 32 correspond to the outer upper portions of the forward legs 13 and the rearward leg portions 33 correspond to the inner upper portions of the rearward legs 14 in this application.

Comparatively referencing FIGS. 4 and 5B, the reader will there consider a walker apparatus 11 having obliquely angled upright leg arrangements 15 with handle portions 12 in which the arrangement planes 112 are aligned with the aperture planes 104 when the first walker tray 10 is mounted upon the walker apparatus 11. In this application, forward upper portions 43 of the forward legs 13 engage forward portions 44 of the handle-receiving apertures 27 at forward ends 39 thereof along the inner leg-engaging edge 31 while rearward upper portions 45 of the rearward legs 14 engage rearward portions 46 of the handle-receiving apertures 27 at rearward ends 42 thereof along the inner leg-engaging edge 31. The forward leg portions 32 correspond to the forward upper portions 43 of the forward legs 13 and the rearward leg portions 33 correspond to the rearward upper portions 45 of the rearward legs 14 in this application.

The reader will note the handle-receiving apertures 27 are configured to be matable with either type of upright leg arrangement 15. To provide this feature, in some embodiments, each handle-receiving aperture 27 of the first walker tray 10 comprises a radiused portion 47 inwardly adjacent of the forward edge 20 and the rearward edge 21 wherein each radiused portion 47 has a uniform radius 113 from an outer aperture side 48 to an inner aperture side 49 parallel to the outer aperture side 48 of the handle-receiving aperture 27. In some embodiments, the radiused portions 47 convexly extend intermediate the aperture width 106 relative to one another at the forward end 39 and the rearward end 42. In some embodiments, the uniform radius 113 is within a radius range of 25 millimeters to 38 millimeters and the corresponding aperture width 106 is within a width range of 50 millimeters to 76 millimeters.

In some embodiments, the uniform radius 113 is within a range of 31 millimeters to 32 millimeters and the corresponding aperture width 106 is within a width range of 62 millimeters to 64 millimeters. The cross-sectional diameter 107 of the tubular body of each handle portion 12 is lesser than these dimensions and thus the handle-receiving apertures 27 are able to receive the handle portions 12 widthwise or across the aperture widths 106. In some embodiments, the aperture length 105 extending intermediate the forward end 39 and the rearward end 42 of each handle-receiving aperture 27 is within a length range of 300 millimeters to 310 millimeters and in some embodiments, the aperture length 105 extending intermediate the forward end 39 and the rearward end 42 of each handle-receiving aperture 27 is within a length range of 304 millimeters to 306 millimeters.

Figure 13A:
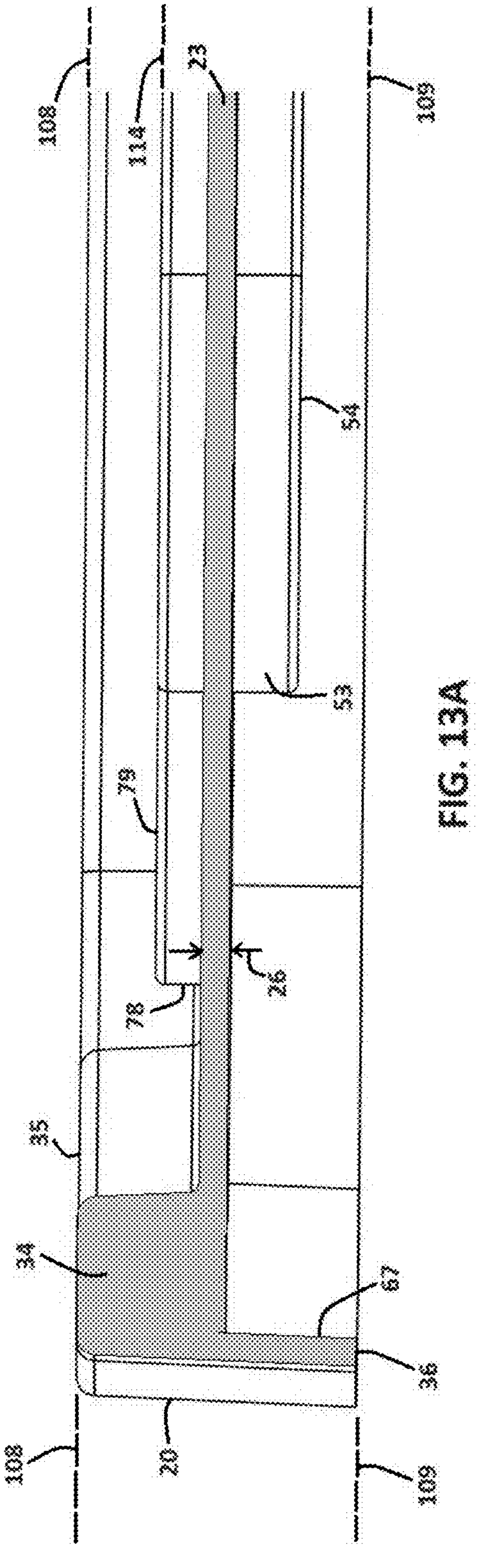
FIG. 13A is an enlarged fragmentary internal edge view of left portions of the cross-section of the first walker tray otherwise depicted in FIG. 12.
Figure 13B:
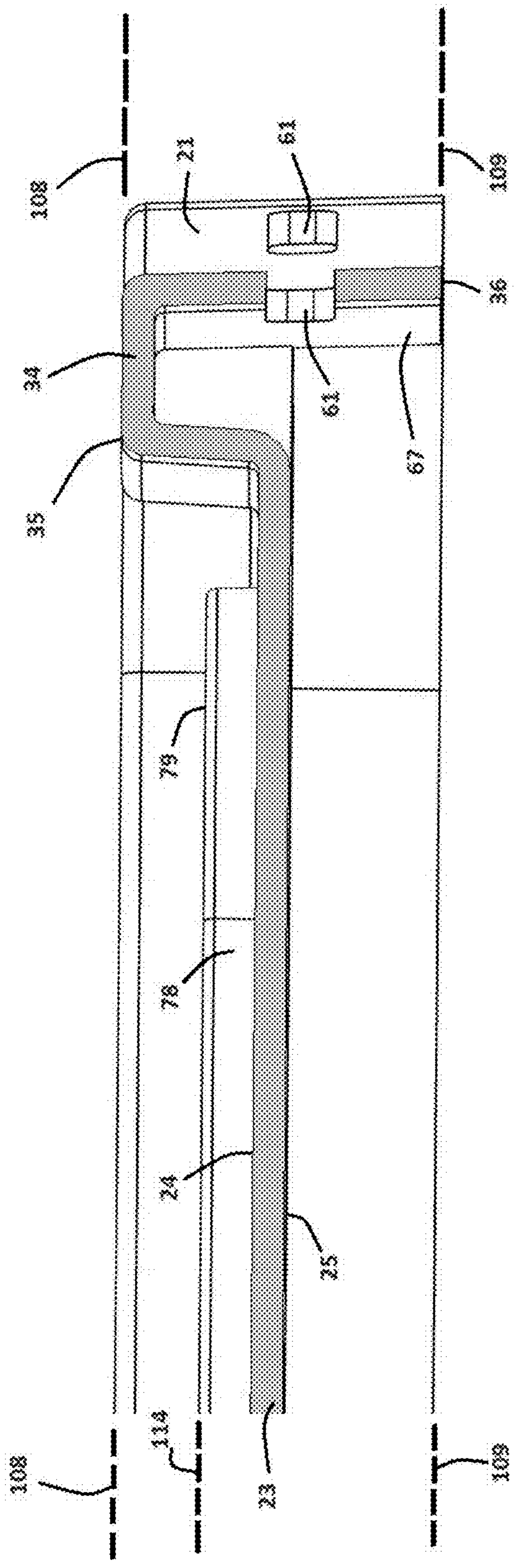
FIG. 13B is an enlarged fragmentary internal edge view of right portions of the cross-section of the first walker tray otherwise depicted in FIG. 12.
Figure 14:
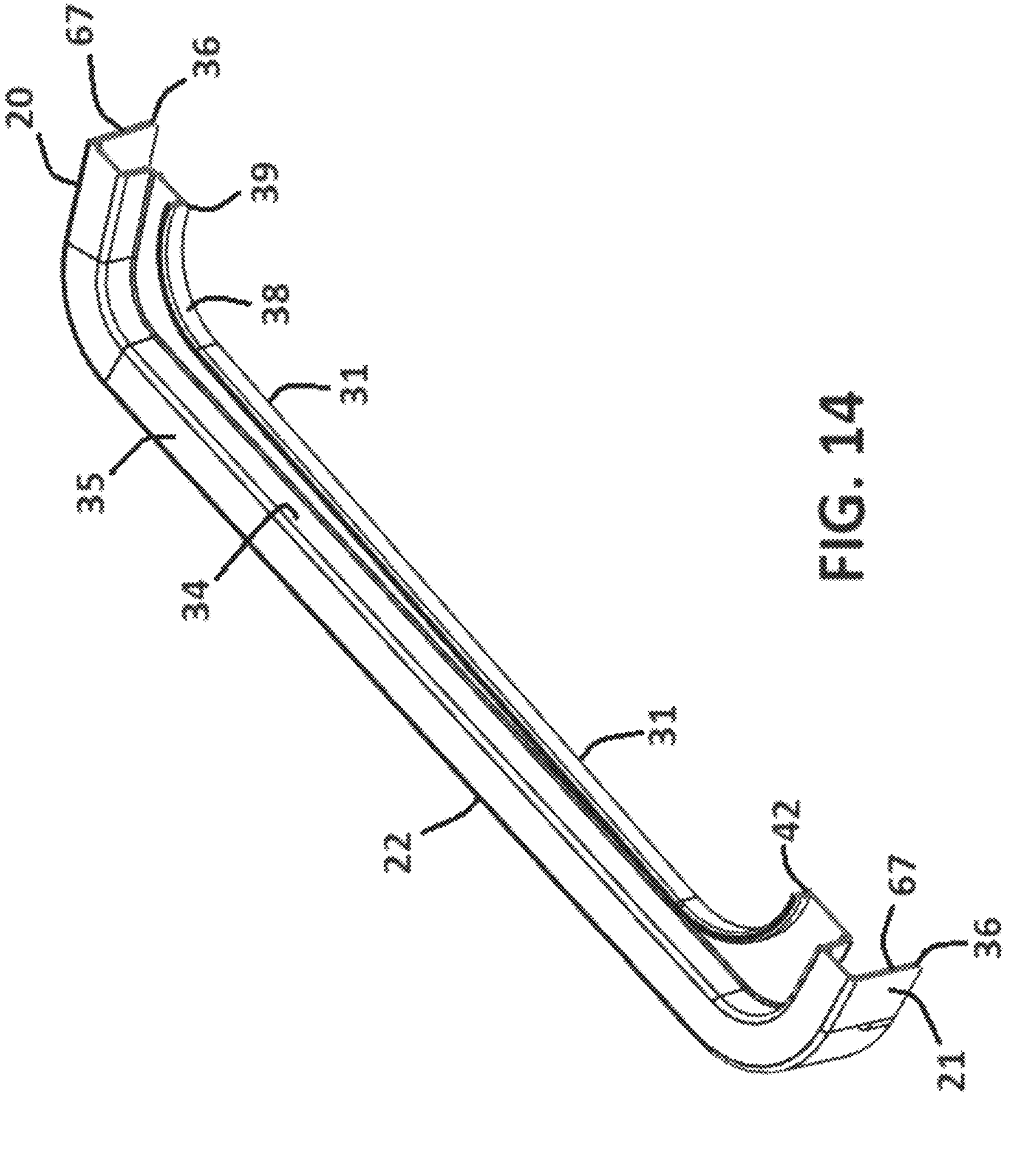
FIG. 14 is a top cross-sectional perspective view of the first walker tray according to the presently disclosed subject matter as sectioned along a plane extending lengthwise through a first handle-receiving aperture of two handle-receiving apertures of the first walker tray.
Figure 15:
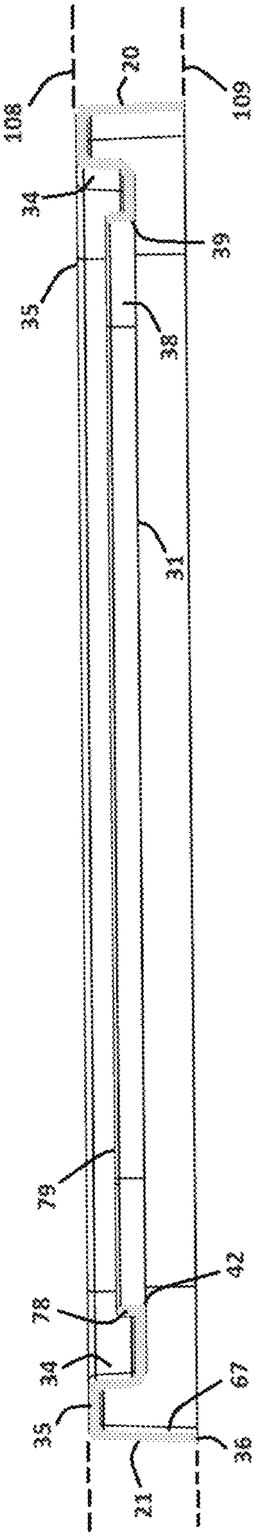
FIG. 15 is an internal edge view of the cross-section of the first walker tray otherwise depicted in FIG. 14.
Figure 16:
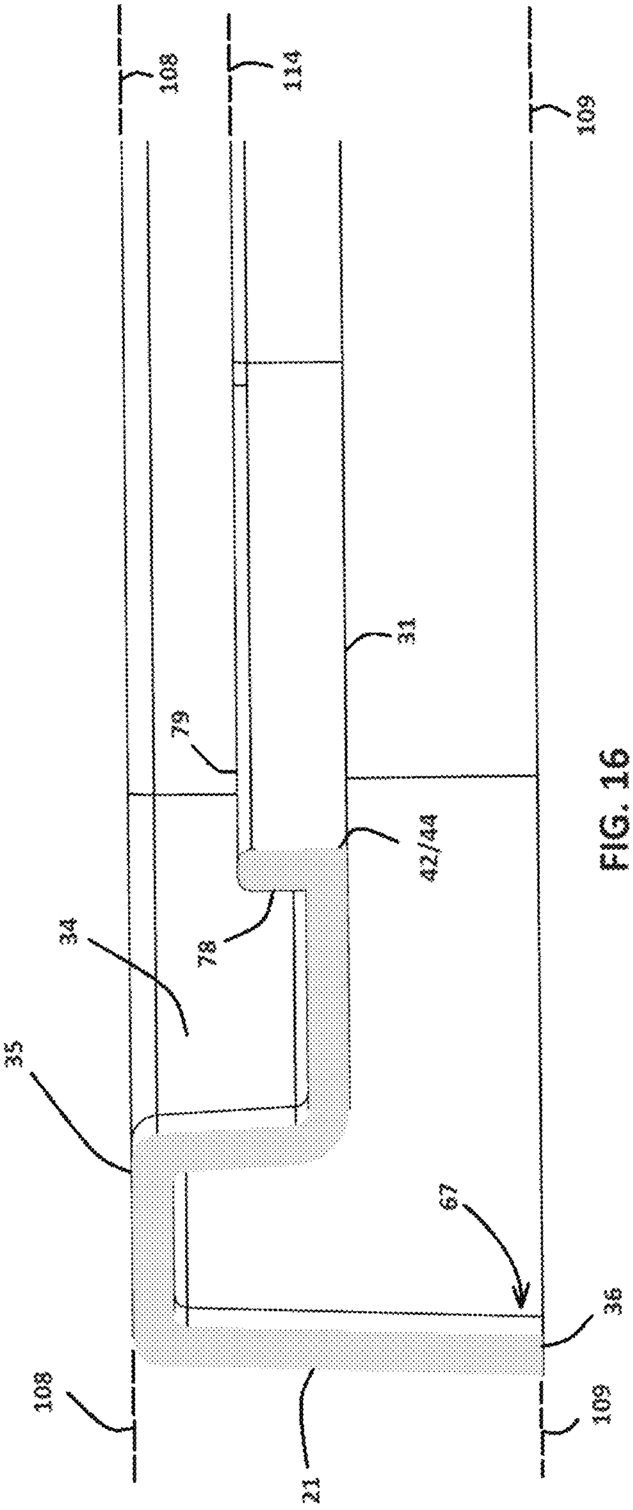
FIG. 16 is an enlarged fragmentary internal edge view of left portions of the cross-section of the first walker tray otherwise depicted in FIG. 15.
Figure 17:
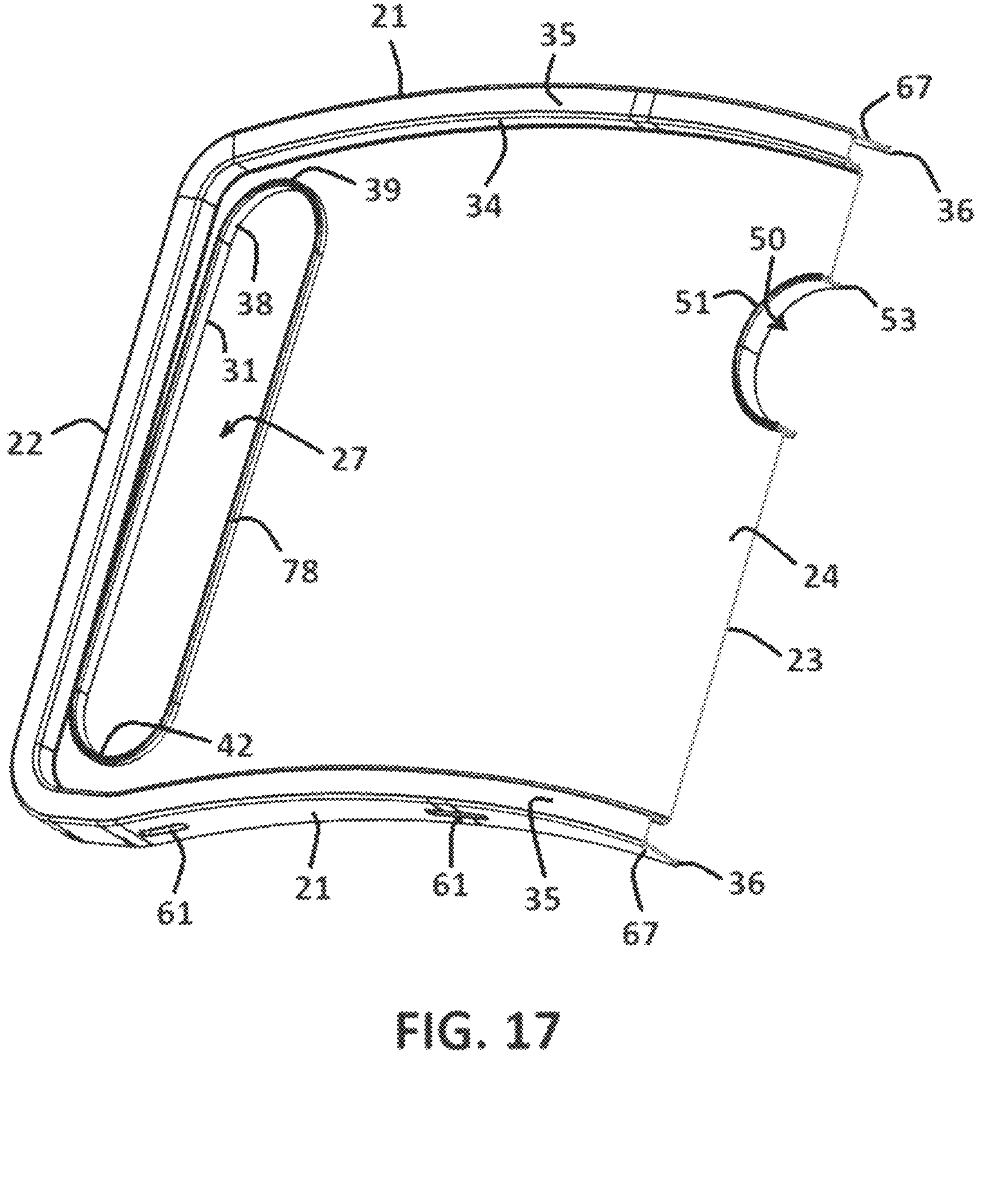
FIG. 17 is a top cross-sectional perspective view of the first walker tray according to the presently disclosed subject matter as sectioned along a plane extending through a third aperture of the first walker tray.
Figure 18:
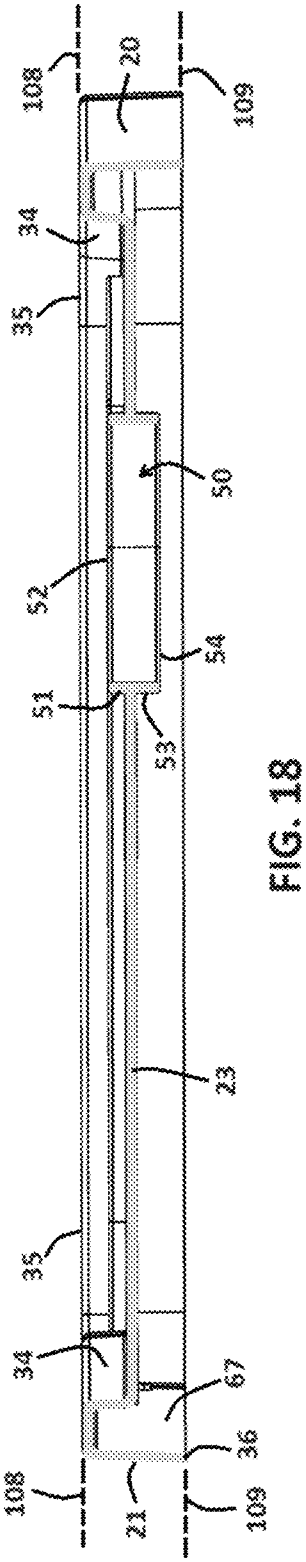
FIG. 18 is an internal edge view of the cross-section of the first walker tray otherwise depicted in FIG. 17.
Figure 19:
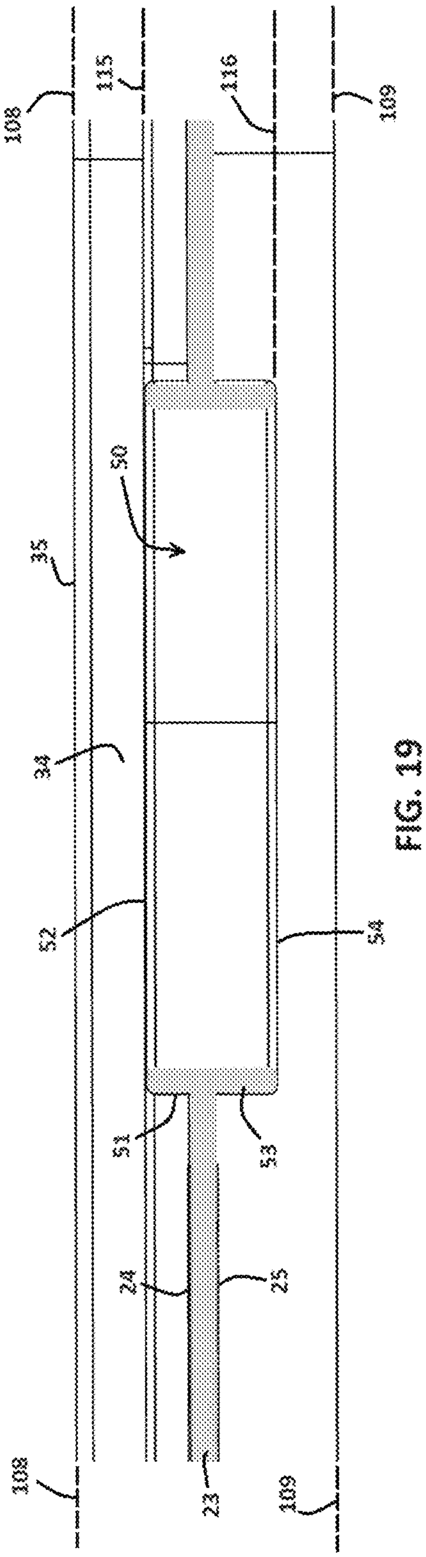
FIG. 19 is an enlarged fragmentary internal edge view of third aperture portions of the cross-section of the first walker tray otherwise depicted in FIG. 18.
Figure 20:
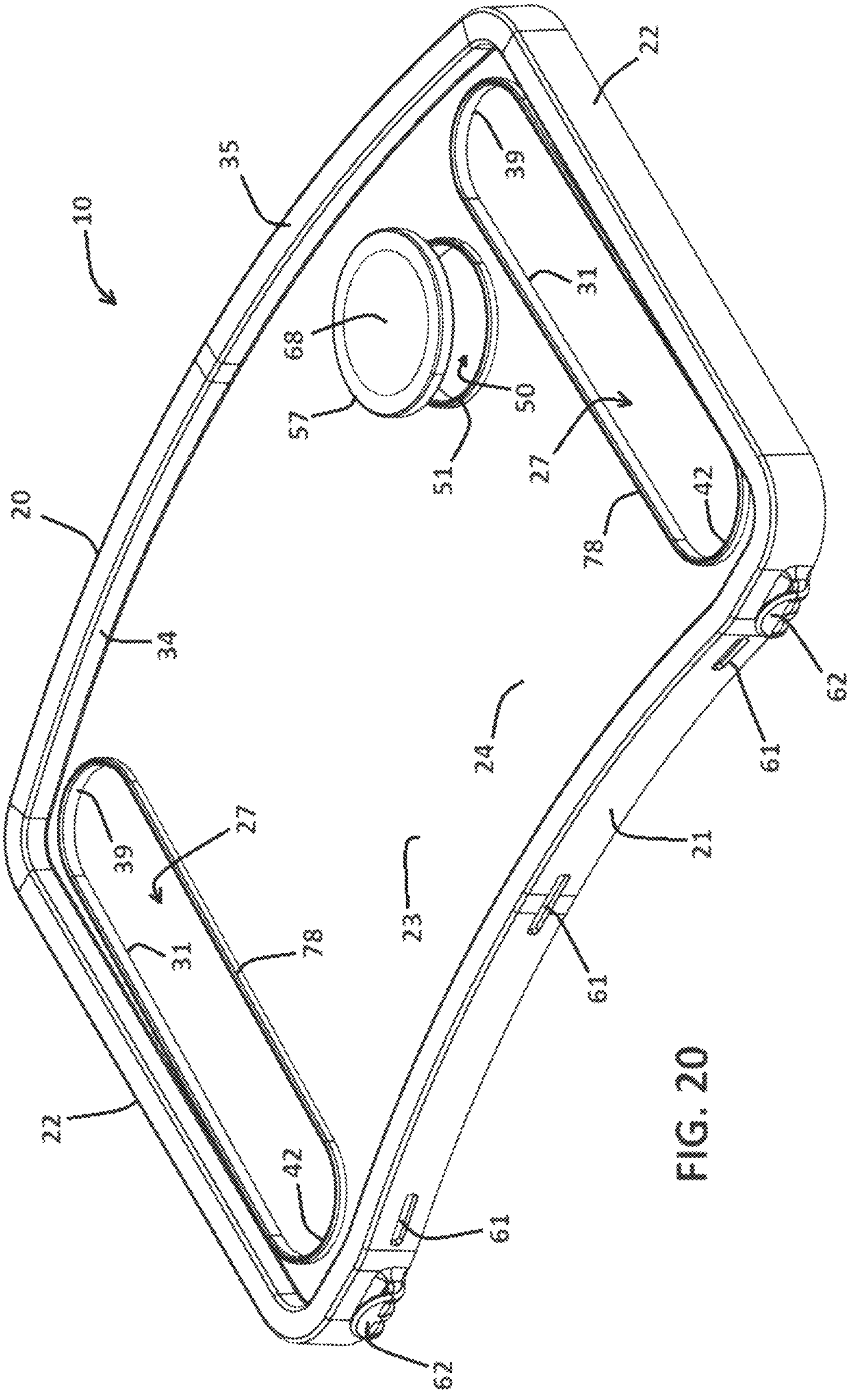
FIG. 20 is a third top perspective view of the first walker tray according to the presently disclosed subject matter shown with an optional removable lens element in exploded relation relative to the first walker tray over the third aperture.

In some embodiments, each handle-receiving aperture 27 comprises a peripheral aperture ridge formation 78 such that a first upper ridge portion 79 of the upper peripheral aperture ridge formation 78 extends in a first upper ridge plane 114 intermediate the upper tray surface 24 and the upper edge plane 108 in parallel relation thereto as generally depicted in FIGS. 13A and 13B. In some embodiments, the first walker tray 10 further comprises at least a third aperture 50 extending through the upper and lower tray surfaces 24 and 25 of the tray support portion 23. In some embodiments, the third aperture 50 is circular in form and comprises an aperture diameter 136. In some embodiments, the aperture diameter 136 is on the order of 75 to 80 millimeters.

In some embodiments, the third aperture 50 comprises an upper peripheral aperture ridge formation 51 such that an upper ridge portion 52 of the upper peripheral aperture ridge formation 51 extends in a second upper ridge plane 115 intermediate the upper tray surface 24 and the upper edge plane 108 in parallel relation thereto. In some embodiments, the first and second upper ridge planes 114 and 115 are coplanar. In some embodiments, the third aperture 50 comprises a lower peripheral aperture ridge formation 53 such that a lower ridge portion 54 of the lower peripheral aperture ridge formation 53 extends in a lower ridge plane 116 intermediate the lower tray surface 25 and the bottom edge plane 109 in parallel relation thereto.

Figure 21:
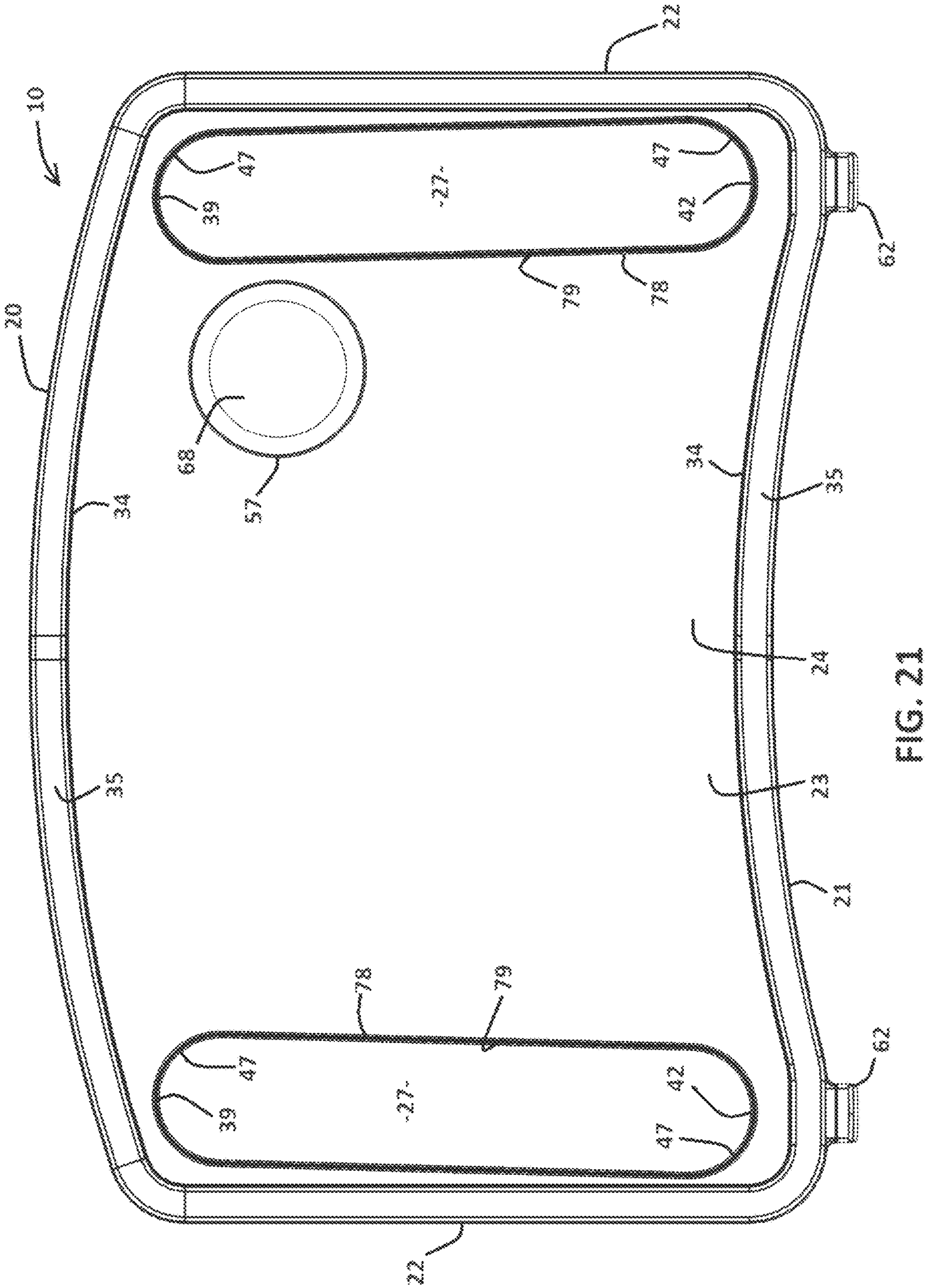
FIG. 21 is a top plan view of the first walker tray according to the presently disclosed subject matter shown with the optional removable lens element over the third aperture.
Figure 22:
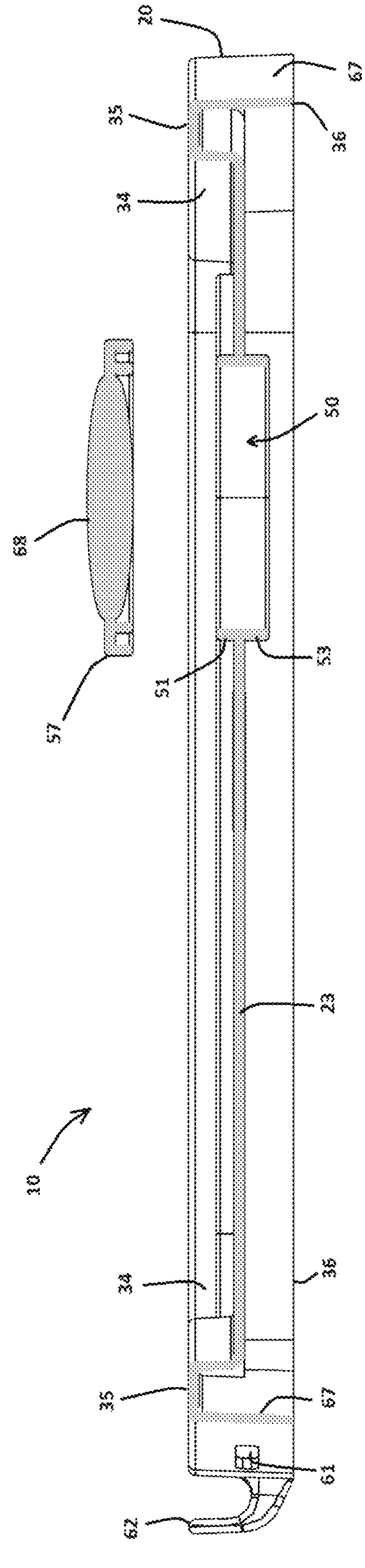
FIG. 22 is a cross-sectional view of the first walker tray according to the presently disclosed subject matter as sectioned along a plane extending through the third aperture and optional removable lens element in exploded relation relative to the first walker tray over the third aperture.
Figure 23:
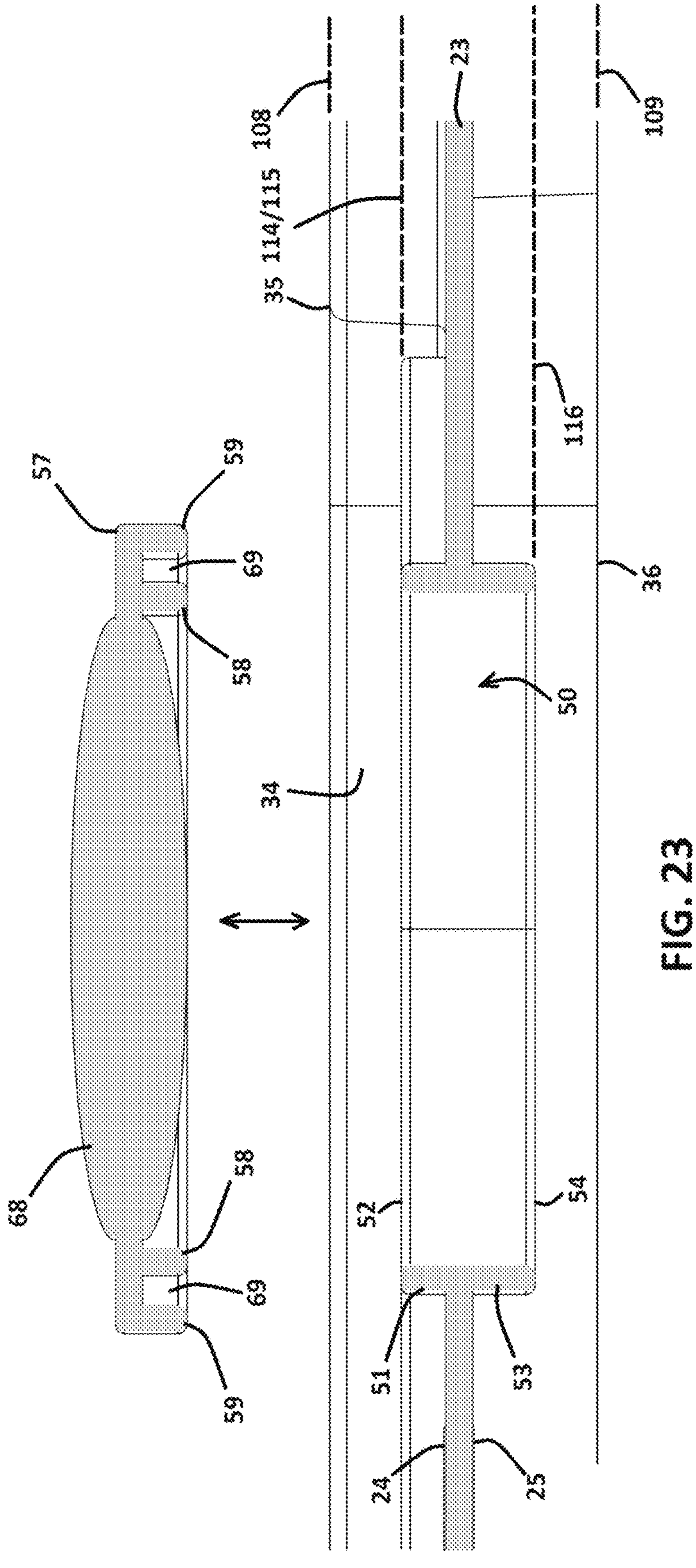
FIG. 23 is an enlarged fragmentary internal edge view of third aperture portions of the cross-section of the first walker tray otherwise depicted in FIG. 22 showing the removable lens element over the third aperture.

In some embodiments, the first walker tray 10 may further comprise a removable lens element 57 as generally depicted and referenced in FIGS. 21 through 23. The removable lens element 57 is configured to removably attach to at least the third aperture 50 for refracting light passing therethrough. In some embodiments, the removable lens element 57 may be characterized by comprising a biconvex lens 68 to provide users 200 with a removable magnifying lens feature. In some embodiments, the removable lens element 57 is configured to seat upon the upper peripheral aperture ridge formation 51. In this regard, the removable lens element 57 may comprise a downwardly extending inner peripheral edge 58 and a downwardly extending outer peripheral edge 59 concentric about the inner peripheral edge 58 with a channel 69 therebetween configured to receive the upper peripheral aperture ridge formation 51.

In some embodiments, the upper peripheral edge ridge formation 34, the peripheral aperture ridge formations 78 of the handle-receiving apertures 27, and the upper peripheral aperture ridge formation 51 of the third apertures 50 extend upwardly from the upper tray surface 24 of the tray support portion 23 to corral objects such as writing implements and possibly spilled liquids upon the upper tray surface 24 to prevent the same from falling through the handle-receiving apertures 27 or the third aperture 50. In some embodiments, the upper peripheral aperture ridge formation 51 and the lower peripheral aperture ridge formation 53 are coextensive thereby forming a cylindrical sleeve formation, which cylindrical sleeve formation may operate to receive and hold objects exemplified by a liquid container or other similarly shaped objects, particularly those having a diameter configured to mate with the sleeve formation.

Figure 28:
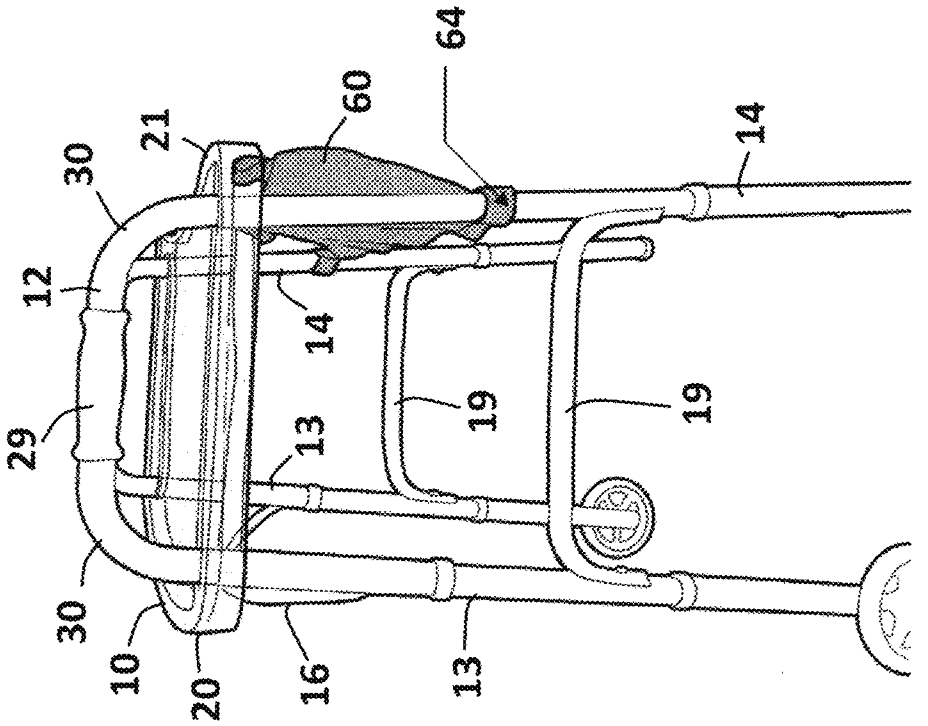
FIG. 28 is a lateral perspective view of a generic walker apparatus with the first walker tray according to the presently disclosed subject matter installed thereupon with an optional utility bag installed on the first walker tray and generic walker apparatus.
Figure 27:
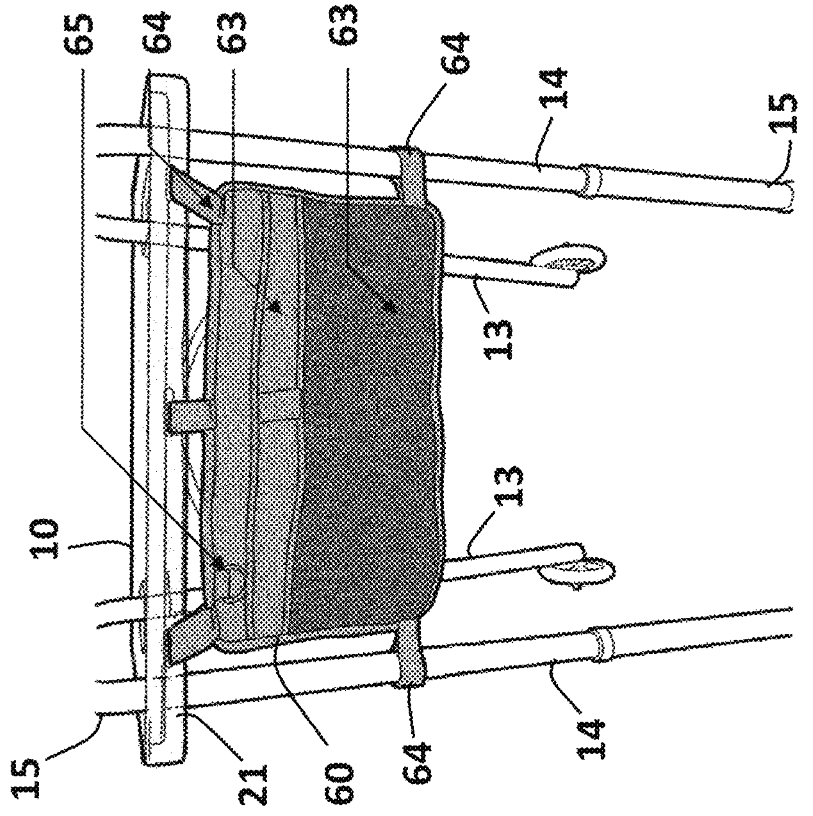
FIG. 27 is a rearward perspective view of a generic walker apparatus with the first walker tray according to the presently disclosed subject matter installed thereupon with an optional utility bag installed on the first walker tray and generic walker apparatus.

Turning now to the second walker tray 70 according to the presently disclosed subject matter, the second walker tray 70 is designed for use with either a walker apparatus 11 or a rollator apparatus (not specifically illustrated). The second walker tray 70 is generally depicted and referenced in FIGS. 29 through 32. As earlier described, the walker apparatus 11 has laterally opposable handle portions 12 each of which extend in a handle plane 102 having a horizontal dimension. In some embodiments, the handle planes 102 of each handle portion 12 are coplanar and substantially horizontal with the horizontal plane 122 as generally depicted in FIG. 4. In some embodiments, the handle plane(s) 102 are slightly obliquely angled relative to the horizontal as generally depicted in FIG. 28.

Each handle portion 12 is supported within a respective handle plane 102 by way of at least one leg. In some embodiments, each handle portion 12 is supported within a respective handle plane 102 by way of a forward leg 13 and a rearward leg 14. Accordingly, in a preferred application, the walker apparatus 11 comprises two forward legs 13 and two rearward legs 14. Together the forward legs 13 and rearward legs 14 support the handle portions 12 within the handle plane(s) 102. The walker apparatus 11 may also be said to comprise laterally opposed upright leg arrangements 15 each of which comprise from front to back: a forward leg 13, a handle portion 12, and a rearward leg 14 such that the handle portion 12 interconnects the forward leg 13 and the rearward leg 14 of each upright leg arrangement 15 at upper portions thereof.

In some embodiments, the second walker tray 70 according to the presently disclosed subject matter is designed to cooperate with a walker apparatus 11 generally formed from a tubular structural material as exemplified by tubular steel or aluminum having a generally uniform cross-sectional diameter as at 107 along the handle portions 12, the forward leg portions 13 and the rearward leg portions 14 particularly at the upper portions of the upright leg arrangements 15. In some embodiments, the forward legs 13 extend in a forward leg plane 103F and the rearward legs 14 extend in a rearward leg plane 103R, which leg planes 103F and 103R are angled relative to one another and a vertical plane as at 121.

In some embodiments, the walker apparatus 11 further comprises a cross-member arrangement 16 extending intermediate the forward legs 13, which forward legs 13 are pivotally attached to the cross-member arrangement 16 of each upright leg arrangement. Laterally opposed pivot limiter elements 17 are connected to the cross-member arrangement 16 and an upper crossbar 18 of each upright leg arrangement 15. The upper crossbars 18 extend intermediate the forward leg 13 and the rearward leg 14 of each upright leg arrangement 15 in inferior adjacency to the handle portion 12 in substantially parallel relation thereto. Each upright leg arrangement 15 may further comprise a lower crossbar 19. The lower crossbars 19 extend intermediate the forward legs 13 and the rearward legs 14 of each upright leg arrangement 15 in inferior adjacency to the upper crossbar 18 in substantially parallel relation thereto.

In some embodiments, the upright leg arrangements 15 are pivotal about a pivot axis of rotation extending through the forward legs 13 at opposite ends of the cross-member arrangement 16. The upright leg arrangements 15 are pivotal so as to allow the user 200 to pivot the same about the pivot axes of rotation in a first rotational direction for configuring the walker apparatus into a first, usage state as generally depicted in FIGS. 24A through 28 and further about the pivot axes of rotation in a direction opposite the first direction for collapsing the walker apparatus 11 into a second, stowage or collapsed state (not specifically illustrated). The second walker tray 70 according to the presently disclosed subject matter is attachable to the walker apparatus 11 when in the first, usage state and removable therefrom before reconfiguring the walker apparatus 11 into the second, stowage or collapsed state.

In some embodiments, the second walker tray 70 is formed from an injection molding process using a light-transmissive material exemplified by polycarbonate or acrylic materials. Such materials enable injection molding processes and provide a lightweight yet durable material construction. They further provide light-transmittance through the second walker tray 70 and an ability to add a wide range of color tones to the material while maintaining light-transmittivity thereof for enabling a user 200 to see through at least a portion of the first walker tray 10 to see or visibly perceive objects thereunder as exemplified by a ball as at 125.

As with the first walker tray 10, it is here noted that a preferred manufacturing process for the second walker tray 70 is also by way of an injection-molding process, at least in part. This should not be construed as limiting but rather exemplary. Other types of suitable manufacturing processes include, but are not limited to CNC machining, thermoset manufacturing, rotational molding, thermoforming, 3D printing, extrusion, and vacuum forming processes, the last of which is notably one of the most widely-used methods of thermoforming, a common alternative to injection molding.

The second walker tray 70 is designed to be mounted or installed upon a walker apparatus as variously depicted and referenced at 11 and in this regard, comprises a second tray-to-walker attachment mechanism configured to removably attach the second walker tray 70 to the walker apparatus 11 so as to position a tray support portion 74 thereof in a support plane so as to provide a horizontal support surface for enabling a user to support items thereupon. In some embodiments, the tray-to-walker attachment mechanism may be characterized by a plurality of resilient clip elements 75 extending from at least two portions of a forward portion 71, a rearward portion 73, and laterally opposed portions 72 of the second walker tray 70. The resilient clip elements 75 are attached to at least first and second portions of the forward portion 71, the rearward portion 73, and laterally opposed portions 72 and also the walker apparatus 11. In some embodiments, the resilient clip elements 75 are attached to the laterally opposed portions 72 and either the forward legs 13 or rearward legs 14 of the walker apparatus 11 as the user 200 may elect.

Figure 29:
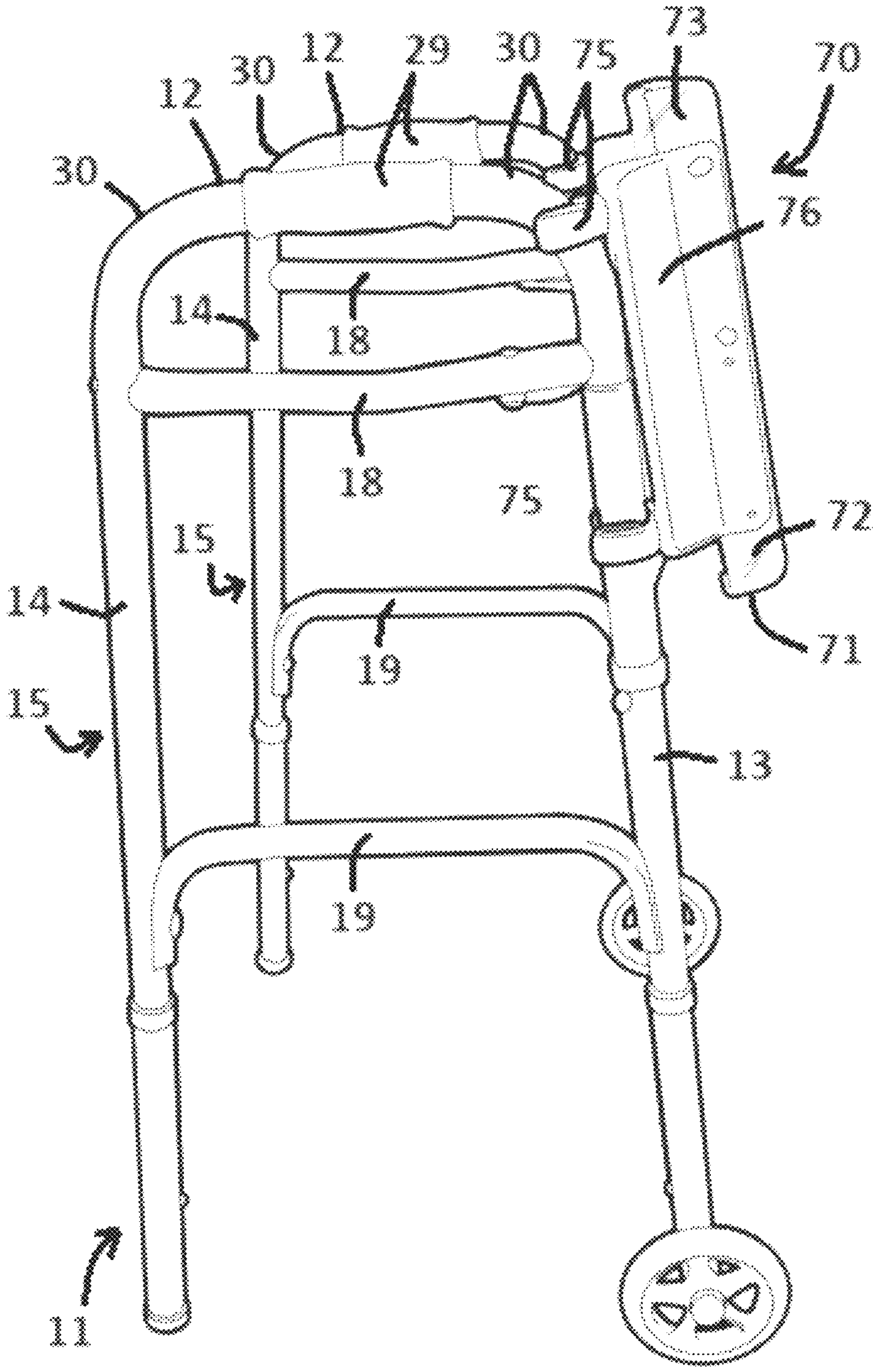
FIG. 29 is a side perspective view of a second walker tray according to the presently disclosed subject matter showing a tray support portion of the second walker tray attached to forward legs of a walker apparatus and pivoted downwardly into a stowage configuration.
Figure 30:
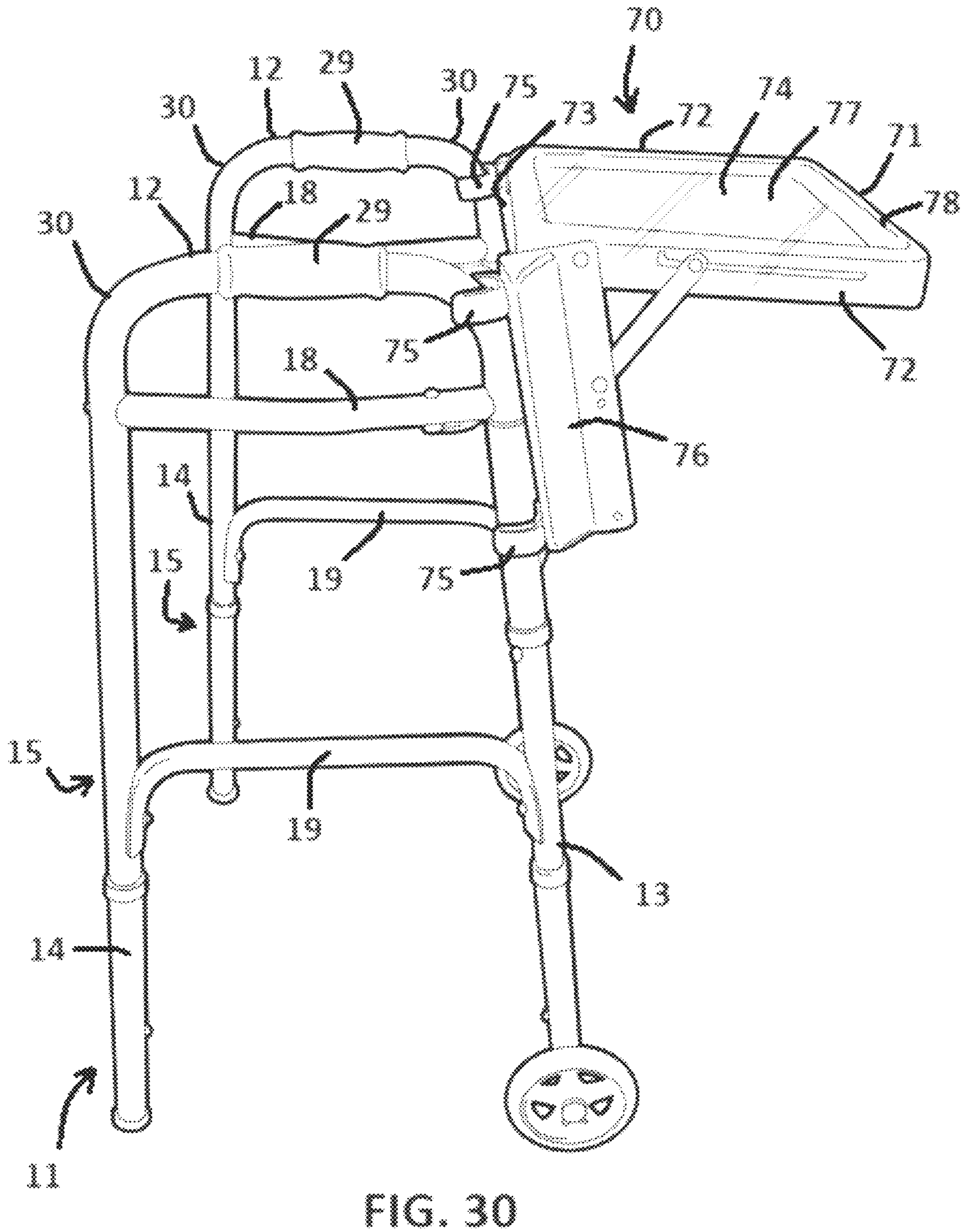
FIG. 30 is a side perspective view of the second walker tray according to the presently disclosed subject matter showing the tray support portion of the second walker tray attached to forward legs of a walker apparatus and pivoted upwardly into an object support configuration.
Figure 31:
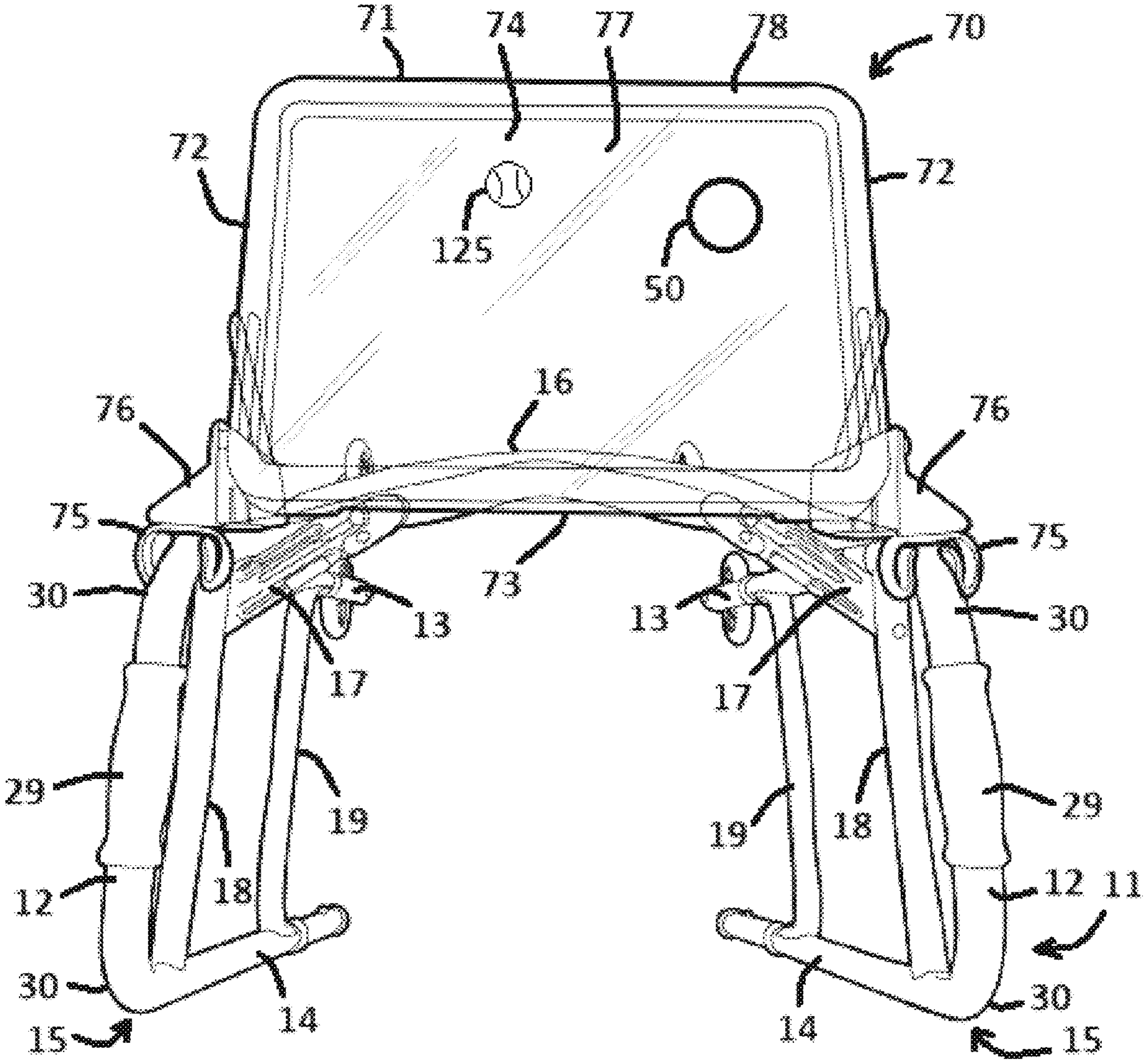
FIG. 31 is a top perspective view of the second walker tray according to the presently disclosed subject matter showing the tray support portion of the second walker tray attached to forward legs of a walker apparatus and pivoted upwardly into an object support configuration.
Figure 32:
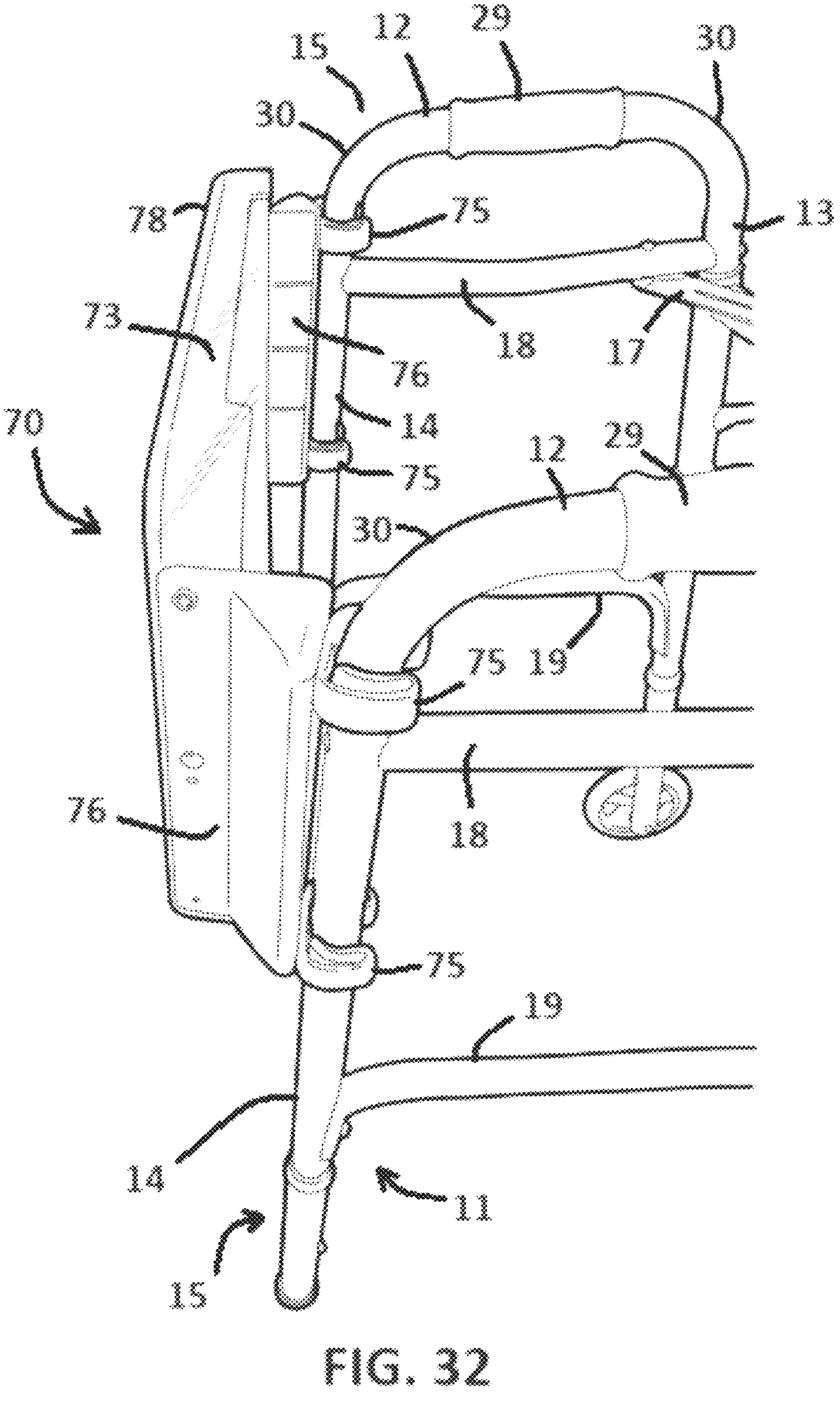
FIG. 32 is a side perspective view of the second walker tray according to the presently disclosed subject matter showing the tray support portion of the second walker tray attached to rearward legs of a fragmentary walker apparatus and pivoted downwardly into a stowage configuration.

In some embodiments, the plurality of resilient clip elements 75 comprise paired sets of clip elements extending from at least two portions of the forward portion 71, the rearward portion 73, and the laterally opposed portions 72. In some embodiments, each paired set of resilient clip elements 75 extend from the laterally opposed portions 72. In some embodiments, the resilient clip elements 75 attach the second walker tray 70 to the front legs 13 as generally depicted in FIG. 29 through 31; and in some embodiments, the resilient clip elements 75 attach the second walker tray 70 to the rear legs 14 attach the second walker tray 70 as generally depicted in FIG. 32.

Recalling the walker apparatus 11 comprises a tubular structural material as exemplified by tubular steel or aluminum having a generally uniform cross-sectional diameter as at 107, the resilient clip elements 75 are configured to clip on to either of the front legs 13 or the rear legs 14 across the cross-sectional diameter 107. In some embodiments, each paired set of clip elements 75 extend from a main clip body 76. In some embodiments, each main clip body 76 is pivotally attached a respective laterally opposed portion 72. Accordingly, in some embodiments, the tray support portion 74 is pivotal intermediate an object support configuration characterized by a horizontal orientation as generally depicted in FIGS. 30 and 31, and a collapsed configuration characterized by at least a partially vertical orientation as generally depicted in FIGS. 29 and 32.

In some embodiments, the second walker tray 20 according to the presently disclosed subject matter comprises is formed from a material suitable for injection-molding formation. In some embodiments, the material may be polycarbonate or acrylic. The second walker tray 70 as formed from any suitable material comprises a forward edge, side, or portion as at 71, a rearward edge, side or portion 73, laterally opposed edges, sides or portions 72, and a tray support portion 74 extending intermediate the forward portion 71, the rearward portion 73, and the laterally opposed portions 72.

In some embodiments, at least one of the forward portion 71, the rearward portion 73, and the laterally opposed portions 72 may comprise a hanger mechanism for enabling a user 200 to hang a utility bag as at 60 or other hangable items upon the second walker tray 70. In some embodiments, the hanger mechanism may be characterized by at least one of a strap-receiving aperture as at 61 and a loop supporting hook member as at 62. In other words, in some embodiments, the second walker tray 70 may comprise or include integrally molded hook members 62. Although not specifically illustrated as such, the hook members 62 of the second walker tray 70 may be positioned along the rearward portion 73 adjacent the laterally opposed portions 72. However, the hook members 62 may be located on any of the forward, rearward or laterally opposed portions 71, 73, 72 of the second walker tray 70.

It is noted that many users 200 of walkers 11 will purchase an accessory or utility bag as at 60 that may be hung from the frame of the walker apparatus 11. Typically, these accessory or utility bags 60 are hung from one of the sides or the front of the frame. This mounting location requires the user 200, once seated, to move the walker apparatus 11 to gain access to the bag 60. This can be difficult for some users 200 who lack upper body strength. By adding an accessory mounting hanger mechanism as exemplified by strap-receiving apertures 61 or hook members 62 on the rearward portion 73 opposite the user 200, the bag 60 may face the user 200 once seated and does not require the user to manipulate the walker apparatus 11 to gain access to the storage pockets as at 63. Straps 64 of the utility bag 60 may be inserted through the strap-receiving apertures 61 and around the rearward legs 14 to hang the utility bag 60 from the second walker tray 10 and attach the same to the walker apparatus 11. The utility bag 60 may further comprise other attachment mechanisms such as a loop member as at 65 in FIG. 27.

Central to the practice of the invention is the tray support portion 74, which extends intermediate the forward portion 71, the rearward portion 73 and the laterally opposed portions 72 and is configured to support objects placed thereupon (not specifically illustrated). The tray support portion 74 comprises an upper tray surface 77 and a lower tray surface with a substantially uniform tray support thickness extending therebetween. In some embodiments, the tray support portion 74 is substantially planar with a substantially uniform tray thickness within a thickness range of 3 to 5 millimeters. In some embodiments, at least the tray support portion 74 is formed from a light-transmissive material for allowing light to pass therethrough and for enabling a user 200 to see through at least the tray support portion 74 as variously described herein.

In some embodiments, the second walker tray 70 may be formed by way of an injection molding process and according in some embodiments, the entirety of the second walker tray 70 is formed from a light-transmissive material for allowing light to pass therethrough, including the forward portion 71, the rearward portion 73, the laterally opposed edges 72, the tray support portion 74, and the main clip bodies 76. In some embodiments, at least the tray support portion 74 is formed from a colored light-transmissive material for coloring and altering a light-transmittance thereof. In some embodiments, for example, the colored light-transmissive material may be of blue coloration as depicted at hatch marking 55 in FIG. 5A, and in some embodiments the colored light-transmissive material may be of purple coloration as depicted at hatch marking 56 in FIG. 5B.

In this last regard, it is noted the visible spectrum is the band of the electromagnetic spectrum that is visible to the human eye. Electromagnetic radiation within this range of wavelengths is called visible light or more simply "light". A typical human eye will respond to wavelengths from about 380 nanometers (at the ultraviolet end of the spectrum) to about 750 nanometers at (the infrared end of the spectrum). As earlier stated, one possible material for the walker tray is polycarbonate, which exhibits roughly 85% to 90% transmission of visible light within the visible spectrum. Another possible material for the second walker tray 70 is acrylic, which exhibits roughly 92% transmission of visible light within the visible spectrum.

Accordingly, in some embodiments, the second walker tray 70 and at least the tray support portion 74 may be said to exhibit light transmittance within this range and thus may be said to provide a translucent walker tray or at least a translucent tray support portion 74 for enabling users 200 to see therethrough while simultaneously providing some limited degree of non-transparency or opacity so that users 200 are able to visibly discern the structure of the second walker tray 70. While other materials may be used in the formation of the second walker tray 70, a central aspect of the presently disclosed subject matter is to provide a tray support portion

74 that provides translucency for enabling a user 200 to see through at least a portion of the second walker tray 70 for improving overall safety of use of a walker apparatus 11 with the second walker tray 10 installed thereupon.

In some embodiments, the second walker tray 70 according to the presently disclosed subject matter further comprises an upper peripheral edge ridge formation 78 extending along the forward portion 71, the rearward portion 73, and laterally opposed portions 72 such that an upper edge portion of the upper peripheral edge ridge formation 78 extends in an upper edge plane in parallel relation to the upper tray surface 77. In some embodiments, the tray support portion 74 extends intermediate the upper peripheral edge ridge formation 78, which terminates upwardly at the upper edge portion thereof.

In some embodiments, the second walker tray 70 may further comprises an aperture 50 extending through the tray support portion 74 as otherwise described in connection with the first walker tray 10. In some embodiments, the aperture 50 is circular in form and comprises an aperture diameter as at 136. In some embodiments, the aperture diameter 136 is on the order of 75 to 80 millimeters. In some embodiments, the aperture 50 comprises an upper peripheral aperture ridge formation 51 such that an upper ridge portion 52 of the upper peripheral aperture ridge formation 51 extends in an upper ridge plane 115 intermediate the upper tray surface 77 and the upper edge plane of the upper peripheral edge ridge formation 78 in parallel relation thereto.

In some embodiments, the second walker tray 70 may further comprise a removable lens element 57 as generally depicted and referenced in FIGS. 21 through 23. The removable lens element 57 is configured to removably attach to at least the aperture 50 for refracting light passing therethrough. In some embodiments, the removable lens element 57 may be characterized by comprising a biconvex lens 68 to provide users 200 with a removable magnifying lens feature. In some embodiments, the removable lens element 57 is configured to seat upon upper peripheral aperture ridge formation 51. In this regard, the removable lens element 57 may comprise a downwardly extending inner peripheral edge 58 and a downwardly extending outer peripheral edge 59 concentric about the inner peripheral edge 58 with a channel 69 therebetween configured to receive the upper peripheral aperture ridge formation 51.

In some embodiments, the upper peripheral aperture ridge formation 51 of the aperture 50 extends upwardly from the upper tray surface 77 of the tray support portion 74 to corral objects such as writing implements and possibly spilled liquids upon the upper tray surface 77 to prevent the same from falling through the aperture 50. In some embodiments, the upper peripheral aperture ridge formation 51 and the lower peripheral aperture ridge formation 53 are coextensive thereby forming a cylindrical sleeve formation, which cylindrical sleeve formation may operate to receive and hold objects exemplified by a liquid container or other similarly shaped objects, particularly those having a diameter configured to mate with the sleeve formation.

While the above descriptions contain much specificity, this specificity should not be construed as limitations on the scope of the presently disclosed subject matter, but rather as an exemplification thereof. In certain embodiments, the presently disclosed subject matter may be said to essentially teach or disclose a walker tray for use with a walker apparatus having laterally opposable upper handle portions each of which extend in a handle plane. Each handle portion is supportable within the handle plane by a forward leg and a rearward leg, which forward and rearward legs are angled relative to one another. The walker tray according to the presently disclosed subject matter comprises a forward edge, a rearward edge, laterally opposed edges, and a tray support portion extending intermediate the forward, rearward, and laterally opposed edges. The tray support portion comprises an upper tray surface and a lower tray surface.

The walker tray according to the presently disclosed subject matter further comprises a pair of laterally opposed handle-receiving apertures extending through the tray support portion inwardly adjacent the laterally opposed edges each of which extend along an aperture plane intersecting the forward and rearward edges. Each of the handle-receiving apertures has an aperture length extending along the aperture planes and an aperture width extending orthogonally relative to the aperture planes. The aperture lengths and aperture widths are configured to receive at least the upper handle portions of the walker apparatus. Each of the handle-receiving apertures are defined inwardly by an inner leg-engaging edge configured to engage at least a forward leg portion and a rearward leg portion, which forward and rearward leg portions and the inner leg-engaging edge together cooperate to support the walker tray upon the walker apparatus.

In some embodiments, at least the tray support portion of the walker tray is formed from a light-transmissive material for allowing light to pass therethrough and for enabling a user to see through at least the tray support portion of the walker tray. In some embodiments, at least the tray support portion is formed from a colored light-transmissive material for altering the transmittance thereof. In some embodiments, the aperture planes are obliquely angled relative to a forward direction. In some embodiments, the aperture planes are obliquely angled relative to the laterally opposed edges. In some embodiments, the walker tray comprises an upper peripheral edge ridge formation extending along the forward, rearward and laterally opposed edges such that an upper edge portion of the upper peripheral edge ridge formation extends in an upper edge plane in parallel relation to the upper tray surface.

In some embodiments, the walker tray comprises a bottom edge extending in a lower edge plane parallel to the upper ridge plane, the upper tray surface, and the lower tray surface. In some embodiments, each handle-receiving aperture comprises a peripheral aperture ridge formation such that a first upper ridge portion of the upper peripheral aperture ridge formation extends in a first upper ridge plane intermediate the upper tray surface and the upper edge plane in parallel relation thereto. In some embodiments, each handle-receiving aperture comprises a radiused portion inwardly adjacent the forward edge and the rearward edge. In some embodiments, the radiused portions extend convexly relative to one another intermediate the aperture width coextensively therewith.

In some embodiments, forward edge comprises a forward edge radius and the rearward edge comprises a rearward edge radius, the forward and rearward radii being convex relative to a user positioned at the rearward edge. In some embodiments, the rearward edge radius is lesser than the forward edge radius. In some embodiments, the walker tray according to the presently disclosed subject matter comprises at least a third aperture extending through the upper and lower tray surfaces. In some embodiments, the third aperture comprises a third upper peripheral aperture ridge formation that a third upper ridge portion of the third upper peripheral aperture ridge formation extends in a second upper ridge plane intermediate the upper tray surface and the upper edge plane in parallel relation thereto. In some embodiments, the first and second upper ridge planes are coplanar. In some embodiments, the third aperture comprises a lower peripheral aperture ridge formation that a lower ridge portion of the lower peripheral aperture ridge formation extends in a lower ridge plane intermediate the lower tray surface and the lower edge plane in parallel relation thereto.

In some embodiments, the walker tray according to the presently disclosed subject matter may further comprises a removable lens element. The removable element is configured to removably attach to at least the third aperture for refracting light passing therethrough. In some embodiments, the removable lens element is configured to seat upon the third upper peripheral aperture ridge formation. In some embodiments, the removable lens element is characterized by comprising a biconvex lens for optionally providing a magnifier lens element to users. In some embodiments, at least one of the forward edge, the rearward edge and the laterally opposed edges comprises a hanger mechanism for enabling a user to hang a utility bag upon the walker tray. In some embodiments, the hanger mechanism is characterized by at least one of a strap-receiving aperture and a loop supporting hook member.

In some embodiments, a walker tray attaches to a walker apparatus having laterally opposable handle portions each of which extend in a handle plane having a vertical dimension. Each handle portion is supportable within a respective handle plane by at least one leg. In some embodiments, the walker tray according to the presently disclosed subject matter comprises a forward portion, a rearward portion, laterally opposed portions, and a tray support portion extending intermediate said forward, rearward, and laterally opposed portions. In some embodiments, the walker tray further comprises a tray-to-walker attachment mechanism configured to removably attach the walker tray to the walker apparatus so as to position the tray support portion in a support plane for providing a horizontal support surface for enabling a user to support items thereupon. In some embodiments, at least the tray support portion is formed from a light-transmissive material for allowing light to pass therethrough and for enabling the user to see through at least the tray support portion of the walker tray.

In some embodiments, the tray-to-walker attachment mechanism is characterized by a pair of laterally opposed handle-receiving apertures extending through the tray support portion inwardly adjacent the laterally opposed portions each of which extend along an aperture plane intersecting the forward and rearward portions. In some embodiments, each of the handle-receiving apertures has an aperture length extending along a respective aperture plane and an aperture width extending orthogonally relative thereto. In some embodiments, the aperture lengths and aperture widths are configured to receive at least the opposable handle portions.

In some embodiments, the opposable handle portions are supportable within the handle planes by a forward leg and a rearward leg. In some embodiments, the forward and rearward legs are angled relative to one another. In some embodiments, each of the handle-receiving apertures are defined inwardly by an inner leg-engaging edge configured to engage at least a forward leg portion and a rearward leg portion, said forward and rearward leg portions and said inner leg-engaging edges for wedge-supporting the walker tray upon the walker apparatus. In some embodiments, the aperture planes are obliquely angled relative to a forward direction.

In some embodiments, the tray support portion comprises at least one aperture and a removable lens element. In some embodiments, the removable element is configured to removably attach to the at least one aperture for refracting light passing therethrough. In some embodiments, the at least one aperture comprises an upper peripheral aperture ridge formation. In some embodiments, the removable lens element is configured to seat upon the upper peripheral aperture ridge formation.

In some embodiments, the tray-to-walker attachment mechanism is characterized by a plurality of resilient clip elements extending from at least two portions of said forward, rearward, and laterally opposed portions. In some embodiments, the resilient clip elements are attachable to first and second portions of the walker apparatus. In some embodiments, the plurality of resilient clip elements comprises paired sets of clip elements, each paired set of clip elements extending from at least two portions of said forward, rearward, and laterally opposed portions. In some embodiments, each paired set of clip elements extend from a main clip body. In some embodiments, each main clip body is pivotally attached to the laterally opposed portions such that the tray support portion is pivotal intermediate an object support configuration characterized by a horizontal orientation and a collapsed configuration characterized by at least a partially vertical orientation.

Accordingly, although the presently disclosed subject matter has been described by reference to certain embodiments, it is not intended that the walker trays be limited thereby, but that modifications thereof are intended to be included as falling within the broad scope and spirit of the foregoing disclosures and the appended drawings. Insofar as the description above and the accompanying drawings disclose any additional subject matter that is not within the scope of the claims below, the embodiments are not dedicated to the public and the right to file one or more applications to claim such additional embodiments is reserved.

What is claimed is:

1. A walker tray for use with a walker apparatus having opposable upper handle portions each of which are supported by at least a forward leg and a rearward leg, the forward and rearward legs of each upper handle portion being obliquely angled relative to one another, the walker tray comprising:

a forward edge, a rearward edge, laterally opposed edges, and a tray support portion extending intermediate said forward, rearward, and laterally opposed edges, the tray support portion comprising an upper tray surface and a lower tray surface;

a pair of laterally opposed handle-receiving apertures extending through the upper tray surface and the lower tray surface of the tray support portion inwardly adjacent the laterally opposed edges each of which extend along an aperture plane intersecting the forward and rearward edges orthogonally relative to the upper tray surface and the lower tray surface, the aperture planes being obliquely angled relative to a forward direction and the laterally opposed edges;

each of the handle-receiving apertures having an aperture length extending along the aperture planes and an aperture width extending orthogonally relative to the aperture planes, the aperture lengths and aperture widths being configured to receive the opposable handle portions of either (a) a parallel upright leg arrangement or (b) an obliquely angled upright leg arrangement;

each of the handle-receiving apertures defined inwardly by an inner leg-engaging edge configured to engage at least a forward leg portion and a rearward leg portion, said forward and rearward leg portions and said inner leg-engaging edge for wedge-supporting the walker tray upon the walker apparatus such that:

outer upper portions of the forward legs engage outer portions of the handle-receiving apertures at forward ends along the inner leg-engaging edge and inner upper portions of the rearward legs engage inner portions of the handle-receiving apertures at rearward ends along the inner leg-engaging edge of the parallel upright leg arrangement; and forward upper portions of the forward legs engage forward portions of the handle-receiving apertures at forward ends thereof along the inner leg-engaging edge and rearward upper portions of the rearward legs engage rearward portions of the handle-receiving apertures at rearward ends thereof along the inner leg-engaging edge of the obliquely angled upright leg arrangement.

2. The walker tray according to claim 1 wherein at least the tray support portion is formed from a light-transmissive material for allowing light to pass therethrough and for enabling a user to see through at least the tray support portion of the walker tray.

3. The walker tray according to claim 2 wherein at least the tray support portion is formed from a colored light-transmissive material for altering light transmittance thereof.

4. The walker tray according to claim 1 comprising an upper peripheral edge ridge formation extending along said forward, rearward and laterally opposed edges such that an upper edge portion of the upper peripheral edge ridge formation extends in an upper edge plane in parallel relation to the upper tray surface.

5. The walker tray according to claim 4 wherein each handle-receiving aperture comprises an upper peripheral aperture ridge formation such that a first upper ridge portion of the upper peripheral aperture ridge formation extends in a first upper ridge plane intermediate the upper tray surface and the upper edge plane in parallel relation thereto.

6. The walker tray according to claim 1 wherein each handle-receiving aperture comprises a radiused portion inwardly adjacent the forward edge and the rearward edge.

7. The walker tray according to claim 6 comprising at least a third aperture extending through the upper and lower tray surfaces, the third aperture comprising an upper peripheral aperture ridge formation such that an upper ridge portion of the upper peripheral aperture ridge formation extends in an upper ridge plane intermediate the upper tray surface and the upper edge plane in parallel relation thereto.

8. The walker tray according to claim 7 comprising a removable lens element, the removable lens element being configured to removably attach to at least the third aperture for refracting light passing therethrough.

9. The walker tray according to claim 8 wherein the removable lens element is configured to removably seat upon the upper peripheral aperture ridge formation.

10. A walker tray for use with a walker apparatus having opposable handle portions supported within a respective handle plane by a forward leg and a rearward leg, the walker tray comprising:

a forward portion, a rearward portion, laterally opposed portions, and a tray support portion extending intermediate said forward, rearward, and laterally opposed portions;

at least the tray support portion being formed from a light-transmissive material for allowing light to pass therethrough and enabling a user to see through at least the tray support portion of the walker tray; and a tray-to-walker attachment mechanism configured to removably attach the walker tray to the walker apparatus so as to position the tray support portion in a support plane and provide a horizontal support surface for enabling the user to support items thereupon;

the tray-to-walker attachment mechanism being characterized by a pair of laterally opposed handle-receiving apertures extending through the tray support portion inwardly adjacent the laterally opposed portions each of which extend along an aperture plane intersecting the forward and the rearward portions obliquely relative to the support plane;

each of the handle-receiving apertures having an aperture length extending along a respective aperture plane and an aperture width extending orthogonally relative thereto, the aperture lengths and aperture widths being configured to receive at least the opposable handle portions of either (a) a parallel upright leg arrangement or (b) an obliquely angled upright leg arrangement;

each of the handle-receiving apertures are defined inwardly by an inner leg-engaging edge configured to engage at least a forward leg portion and a rearward leg portion, said forward and rearward leg portions and said inner leg-engaging edges for wedge-supporting the walker tray upon the walker apparatus such that:

outer upper portions of the forward legs engage outer portions of the handle-receiving apertures at forward ends along the inner leg-engaging edge and inner upper portions of the rearward legs engage inner portions of the handle-receiving apertures at rearward ends along the inner leg-engaging edge of the parallel upright leg arrangement; and forward upper portions of the forward legs engage forward portions of the handle-receiving apertures at forward ends thereof along the inner leg-engaging edge and rearward upper portions of the rearward legs engage rearward portions of the handle-receiving apertures at rearward ends thereof along the inner leg-engaging edge of the obliquely angled upright leg arrangement.

11. The walker tray according to claim 10, wherein the tray support portion comprises at least one lens aperture and a removable lens element, the removable lens element being configured to removably attach to the at least one lens aperture for refracting light passing therethrough.

12. The walker tray according to claim 11 wherein the at least one lens aperture comprises an upper peripheral aperture ridge formation, the removable lens element being configured to removably seat upon the upper peripheral aperture ridge formation.

13. A walker tray for use with a walker apparatus having opposable handle portions supported within a respective handle plane by at least one leg, the walker tray comprising:

a forward portion, a rearward portion, laterally opposed portions, and a tray support portion extending intermediate said forward, rearward, and laterally opposed portions;

the tray support portion comprising at least one aperture and a removable lens element, the removable lens element being configured to removably attach to the at least one aperture for refracting light passing therethrough; and a tray-to-walker attachment mechanism configured to removably attach the walker tray to the walker apparatus so as to position the tray support portion in a support plane and provide a horizontal support surface for enabling the user to support items thereupon.

14. The walker tray according to claim 13, wherein at least the tray support portion is formed from a light-transmissive material for allowing light to pass therethrough and enabling a user to see through at least the tray support portion of the walker tray.

15. The walker tray according to claim 13, wherein the tray-to-walker attachment mechanism is characterized by a pair of laterally opposed handle-receiving apertures extending through the tray support portion inwardly adjacent the laterally opposed portions each of which extend along an aperture plane intersecting the forward and the rearward portions.

16. The walker tray according to claim 15, wherein each of the handle-receiving apertures has an aperture length extending along a respective aperture plane and an aperture width extending orthogonally relative thereto, the aperture lengths and aperture widths being configured to receive at least the opposable handle portions.

17. The walker tray according to claim 16, wherein the opposable handle portions are supported by a forward leg and a rearward leg, the forward and rearward legs being angled relative to one another, each of the handle-receiving apertures being defined inwardly by an inner leg-engaging edge configured to engage at least a forward leg portion and a rearward leg portion, said forward and rearward leg portions and said inner leg-engaging edges for wedge-supporting the walker tray upon the walker apparatus.

18. The walker tray according to claim 17 wherein:

the aperture lengths and aperture widths are configured to receive at least the opposable handle portions of either (a) a parallel upright leg arrangement or (b) an obliquely angled upright leg arrangement such that:

outer upper portions of the forward legs engage outer portions of the handle-receiving apertures at forward ends along the inner leg-engaging edge and inner upper portions of the rearward legs engage inner portions of the handle-receiving apertures at rearward ends along the inner leg-engaging edge of the parallel upright leg arrangement; and forward upper portions of the forward legs engage forward portions of the handle-receiving apertures at forward ends thereof along the inner leg-engaging edge and rearward upper portions of the rearward legs engage rearward portions of the handle-receiving apertures at rearward ends thereof along the inner leg-engaging edge of the obliquely angled upright leg arrangement.

* * * * *